United States Patent
Numata

(10) Patent No.: US 11,301,955 B2
(45) Date of Patent: Apr. 12, 2022

(54) IMAGE PROCESSING APPARATUS, IMAGING APPARATUS, METHOD FOR CONTROLLING IMAGE PROCESSING APPARATUS AND RECORDING MEDIUM

(71) Applicant: CANON KABUSHIKI KAISHA, Tokyo (JP)

(72) Inventor: Aihiko Numata, Inagi (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 234 days.

(21) Appl. No.: 16/590,606

(22) Filed: Oct. 2, 2019

(65) Prior Publication Data

US 2020/0111192 A1     Apr. 9, 2020

(30) Foreign Application Priority Data

Oct. 3, 2018    (JP) .............................. JP2018-188401

(51) Int. Cl.
    *G06T 3/20*    (2006.01)
    *G06T 7/11*    (2017.01)
(52) U.S. Cl.
    CPC ................. *G06T 3/20* (2013.01); *G06T 7/11* (2017.01); *G06T 2207/20212* (2013.01)
(58) Field of Classification Search
    None
    See application file for complete search history.

(56) References Cited

U.S. PATENT DOCUMENTS

| 6,243,103 | B1* | 6/2001 | Takiguchi ............. G06T 3/4038 |
|           |     |        | 345/634 |
| 7,539,356 | B2  | 5/2009 | Igari et al. |

(Continued)

FOREIGN PATENT DOCUMENTS

| CN | 101710932 A | 5/2010 |
| CN | 105894455 A | 8/2016 |

(Continued)

OTHER PUBLICATIONS

European Search Report dated Jan. 21, 2020, issued in the corresponding European Patent Application No. 19197020.1.

(Continued)

*Primary Examiner* — Anand P Bhatnagar
(74) *Attorney, Agent, or Firm* — Cowan, Liebowitz & Latman, P.C.

(57) ABSTRACT

Provided are a synthesis processing configured to that synthesize a first image acquired by a first imaging unit and a second image acquired by a second imaging unit of which an imaging range overlaps a part of an imaging range of the first imaging unit and generates a wide-angle image and an extraction unit configured to extract a region of interest within an imaging range in which the first imaging unit and the second imaging unit perform overlapping imaging on the basis of at least one of a third image, acquired by a third imaging unit, which includes at least a part of the imaging range in which the first imaging unit and the second imaging unit perform overlapping imaging in an imaging range thereof and a state of the third imaging unit when the third image is captured. The synthesis processing unit adjusts an amount of positional shift between the first image and the second image in the region of interest, and generates the wide-angle image.

11 Claims, 13 Drawing Sheets

(56) References Cited

U.S. PATENT DOCUMENTS

| | | | |
|---|---|---|---|
| 10,623,661 B2* | 4/2020 | Oh | H04N 13/25 |
| 10,872,395 B2* | 12/2020 | Ogino | G03B 15/00 |
| 2004/0085451 A1 | 5/2004 | Chang | |
| 2004/0183941 A1* | 9/2004 | McCutchen | H04N 13/239 |
| | | | 348/373 |
| 2004/0193941 A1* | 9/2004 | Barr | H04L 1/1806 |
| | | | 714/4.4 |
| 2009/0322891 A1* | 12/2009 | Kondo | H04N 5/23238 |
| | | | 348/218.1 |
| 2012/0274739 A1* | 11/2012 | Li | G06T 3/0068 |
| | | | 348/36 |
| 2016/0006933 A1* | 1/2016 | Zimmerman | H04N 5/23238 |
| | | | 348/36 |
| 2017/0302856 A1 | 10/2017 | Noguchi et al. | |
| 2018/0070023 A1* | 3/2018 | Oh | H04N 5/2258 |
| 2018/0205889 A1 | 7/2018 | Abbas et al. | |
| 2019/0082103 A1* | 3/2019 | Banerjee | G06T 3/4038 |
| 2020/0043195 A1* | 2/2020 | Ono | G06T 7/55 |

FOREIGN PATENT DOCUMENTS

| | | |
|---|---|---|
| CN | 106683045 A | 5/2017 |
| EP | 3163535 A1 | 5/2017 |
| JP | 2004-118786 A | 4/2004 |
| JP | 2015-139031 A | 7/2015 |
| JP | 2017-199982 A | 11/2017 |

OTHER PUBLICATIONS

May 7, 2021 Chinese Office Action, which is enclosed with an English Translation, that issued in Chinese Patent Application No. 201910921338.3.

Jul. 21, 2020 Japanese Office Action, which is enclosed without an English Translation, that issued in Japanese Patent Application No. 2018188401.

The above documents were cited in a Dec. 20, 2021 Chinese Office Action, which is enclosed with an English Translation, that issued in Chinese Patent Application No. 201910921338.3.

* cited by examiner

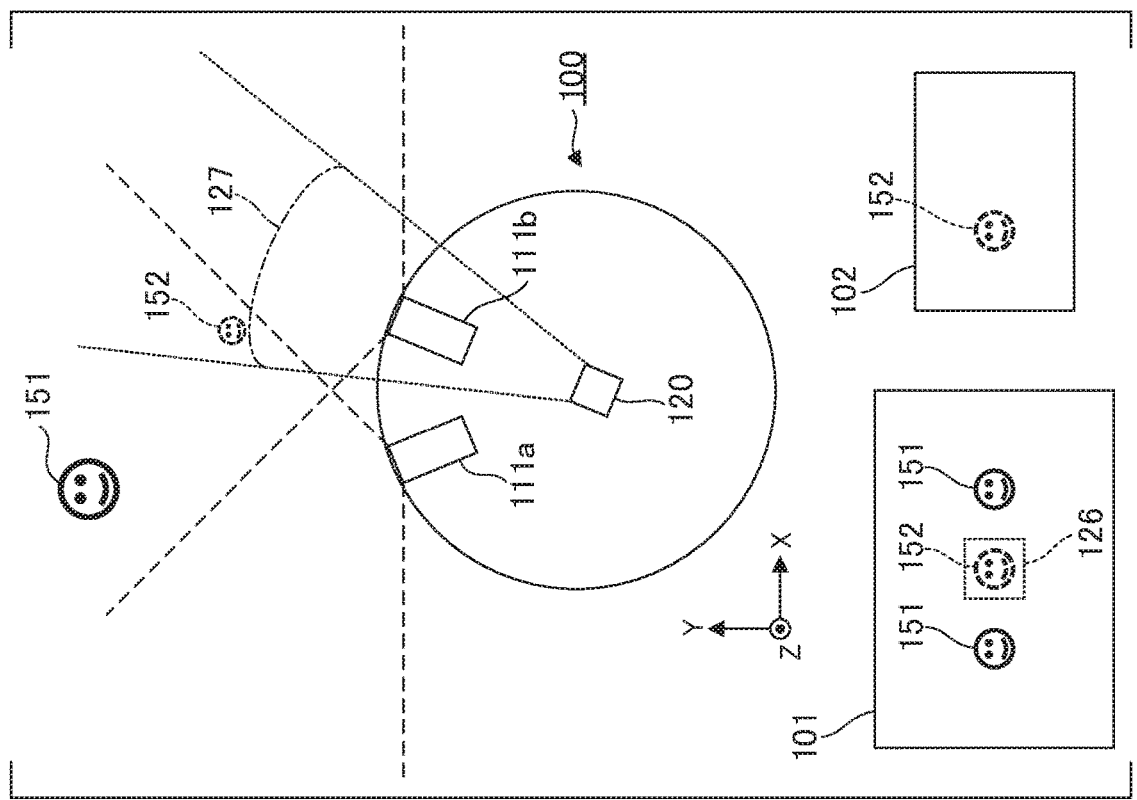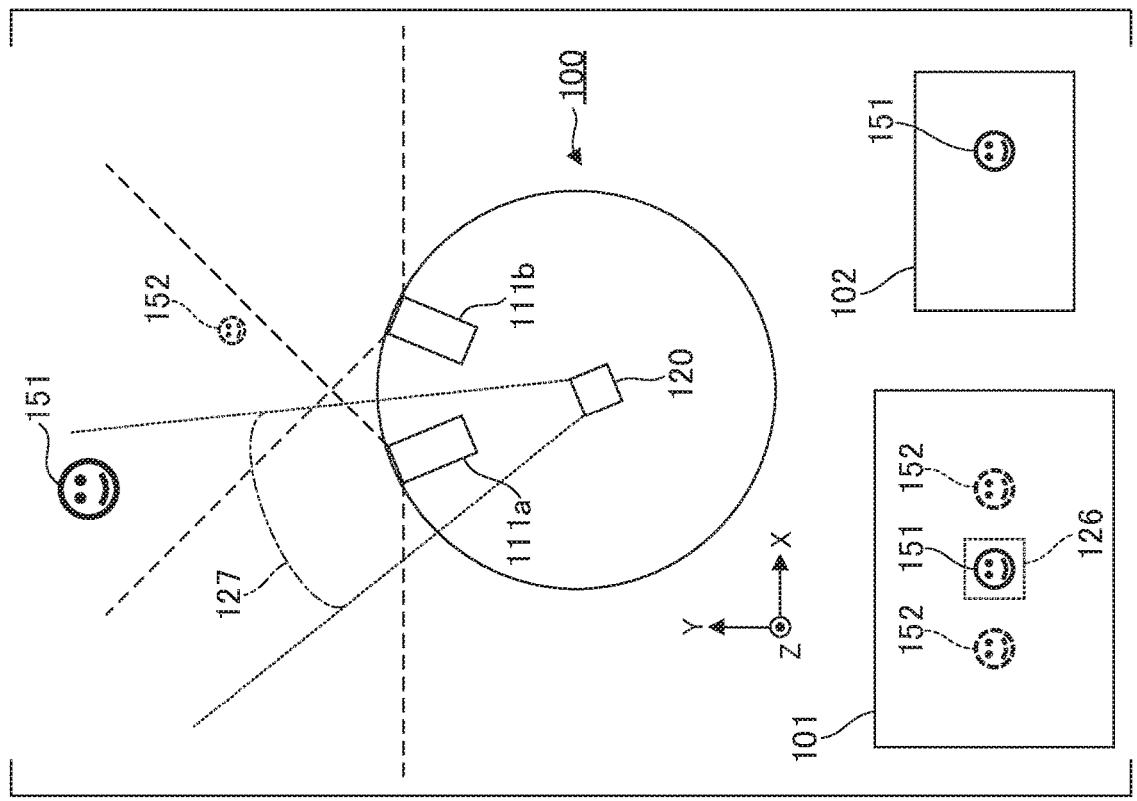

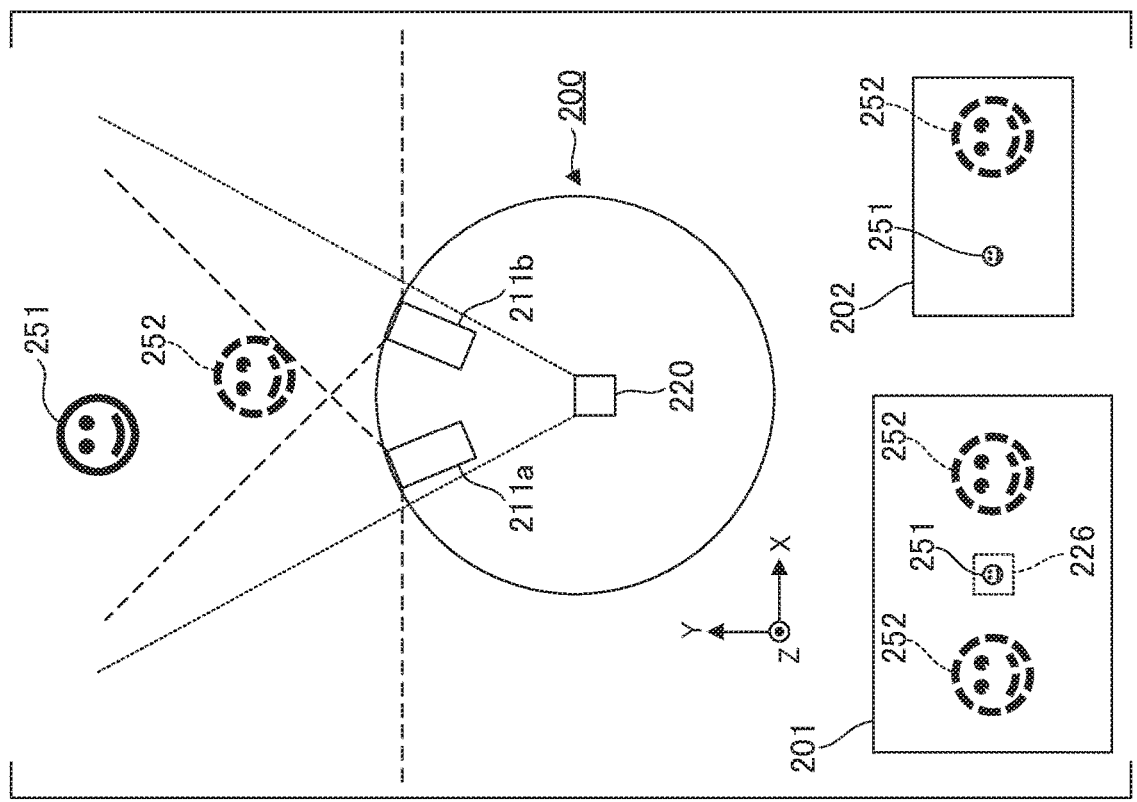
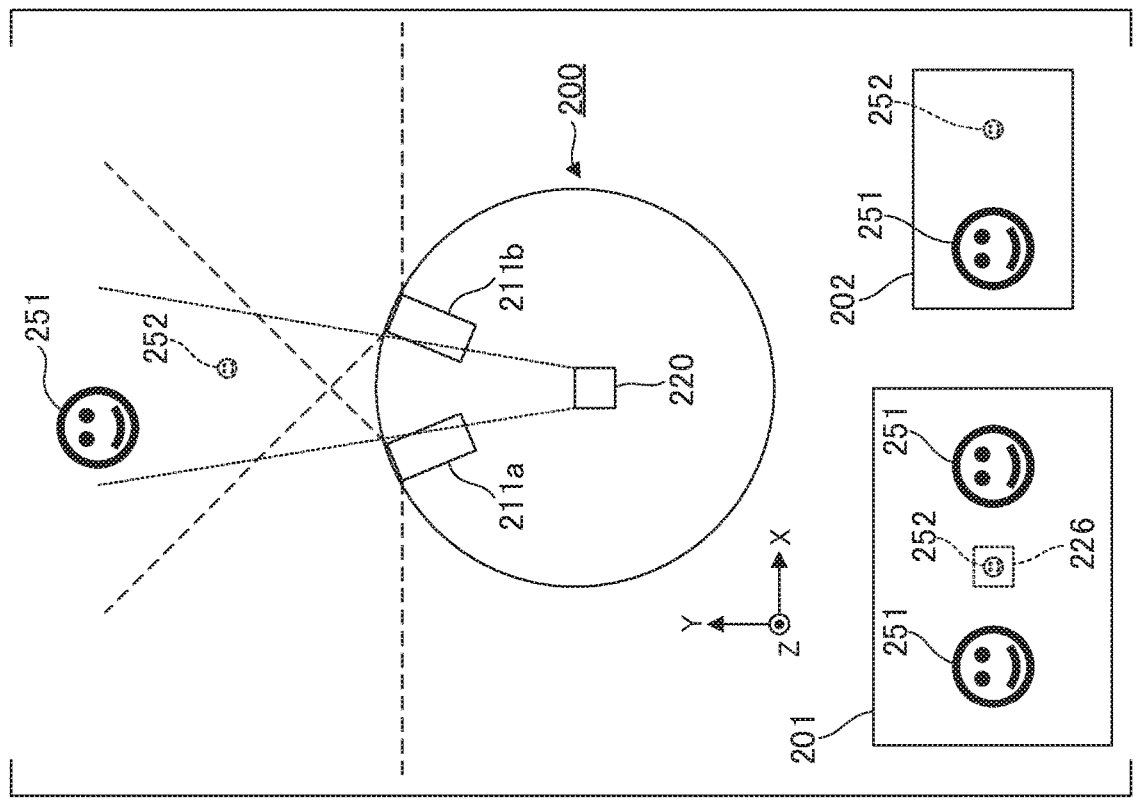

IMAGE PROCESSING APPARATUS, IMAGING APPARATUS, METHOD FOR CONTROLLING IMAGE PROCESSING APPARATUS AND RECORDING MEDIUM

BACKGROUND OF THE INVENTION

Field of the Invention

The present invention relates to an image processing apparatus, an imaging apparatus, a method for controlling an image processing apparatus and a recording medium.

Description of the Related Art

In recent years, imaging apparatuses capable of acquiring an image having a wider imaging range than in a case where a single camera is used (hereinafter referred to as a wide-angle image) by synthesizing images captured by a plurality of cameras disposed side by side (hereinafter referred to as multiple-lens cameras) have been proposed. Japanese Patent Laid-Open No. 2004-118786 discloses an imaging apparatus that obtains the amount of shift between a plurality of images by performing a matching process on the plurality of images including a common portion while shilling the images, and generates a wide-angle image by superimposing the plurality of images.

However, as disclosed in Japanese Patent Laid-Open No. 2004-118786, if a wide-angle image is generated from images captured by the multiple-lens cameras through a matching process so that specific subjects overlap each other, other subjects appear as double images, which leads to concern of a decrease in the visibility of the wide-angle image. This is because the amounts of shift between images captured by the respective multiple-lens cameras are different from each other depending on distances from the multiple-lens cameras to the subjects. If a wide-angle image is generated by shifting a plurality of images having different amounts of shift between images so that the specific subjects overlap each other, other subjects appear as double images.

SUMMARY OF THE INVENTION

The present invention provides an image processing apparatus capable of generating a high-definition wide-angle image when a wide-angle image is generated from a plurality of images.

According to the present invention, there is provided an image processing apparatus including: a synthesis processing unit configured to synthesize a first image acquired by a first imaging unit and a second image acquired by a second imaging unit of which an imaging range overlaps a part of an imaging range of the first imaging unit and generates a wide-angle image; and an extraction unit configured to extract a region of interest within an imaging range in which the first imaging unit and the second imaging unit perform overlapping imaging on the basis of at least one of a third image, acquired by a third imaging unit, which includes at least a part of the imaging range in which the first imaging unit and the second imaging unit perform overlapping imaging in an imaging range thereof and a state of the third imaging unit when the third image is captured, wherein the synthesis processing unit adjusts an amount of positional shift between the first image and the second image in the region of interest, and generates the wide-angle image.

Further features of the present invention will become apparent from the following description of exemplary embodiments with reference to the attached drawings.

BRIEF DESCRIPTION OF THE DRAWINGS

FIGS. 4A and 4B are diagrams illustrating a relationship between the imaging apparatus and a generated wide-angle image.

FIGS. 7A and 7B are diagrams illustrating a relationship between the imaging apparatus and a generated wide-angle image.

DESCRIPTION OF THE EMBODIMENTS

First Embodiment

Figure 1A:
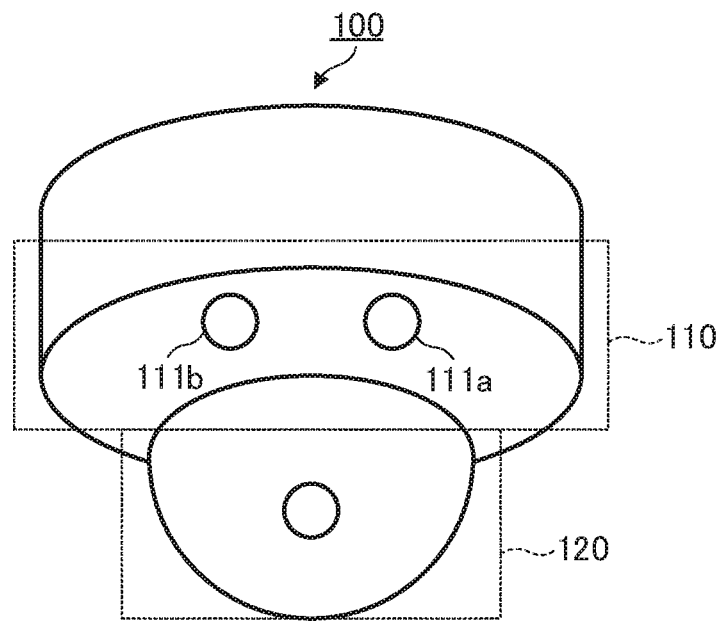
FIGS. 1A and 1B are diagrams illustrating an imaging apparatus.
Figure 1B:
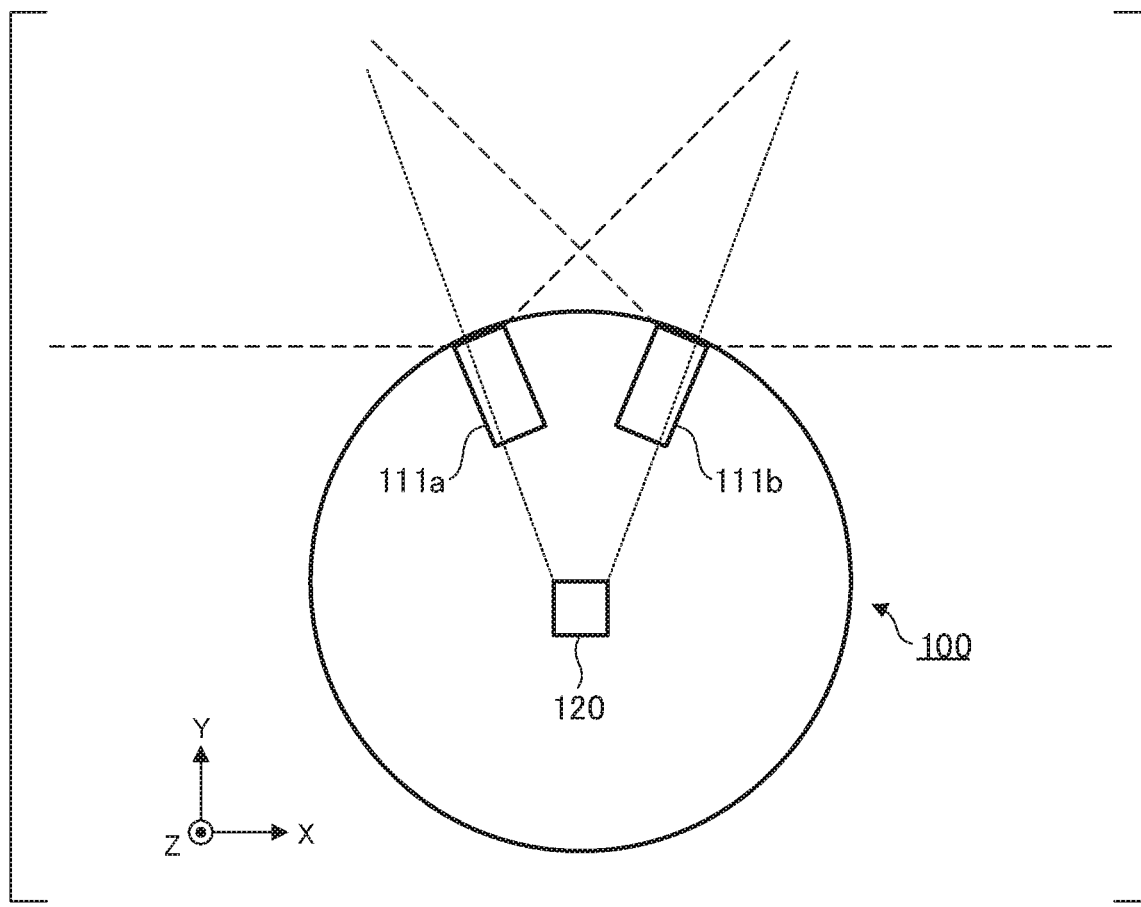

FIGS. 1A and 1B are diagrams illustrating an imaging apparatus 100. The imaging apparatus 100 is, for example, a monitoring camera. FIG. 1A is an overhead view when the imaging apparatus 100 is seen from an oblique direction, and FIG. 1B is a layout view when the imaging apparatus 100 is seen from the upper side (+Z-axis side). The imaging apparatus 100 includes a wide-angle imaging unit 110 that acquires a wide-angle image. The wide-angle imaging unit 110 includes a first imaging unit 111a and a second imaging unit 111b which are disposed so that parts of their imaging ranges overlap each other. Hereinafter, an image which is acquired by the first imaging unit 111a is referred to as a first image, and an image which is acquired by the second imaging unit 111b is referred to as a second image. In the present embodiment, a wide-angle image is generated by synthesizing the first image and the second image. Meanwhile, although an example in which the wide-angle imaging unit 110 includes two imaging units is described in the present embodiment, the wide-angle imaging unit is not limited thereto and may include a plurality of imaging units. In addition, the imaging ranges of the first imaging unit 111a and the second imaging unit 111b are not limited to the ranges shown in FIGS. 1A and 1B, and, for example, the imaging ranges may include a full circumference of 360 degrees.

In addition, the imaging apparatus 100 includes a third imaging unit 120 that images a part of the imaging range of the wide-angle imaging unit 110 and acquires a detailed image (third image) 102. That is, the third imaging unit 120 images a region overlapping at least one imaging range of the first imaging unit 111a or the second imaging unit 111b. The detailed image can be, for example, used as an enlarged image in a wide-angle image 201 or used as a supplementary image for supplementing the wide-angle image 201.

Figure 2:
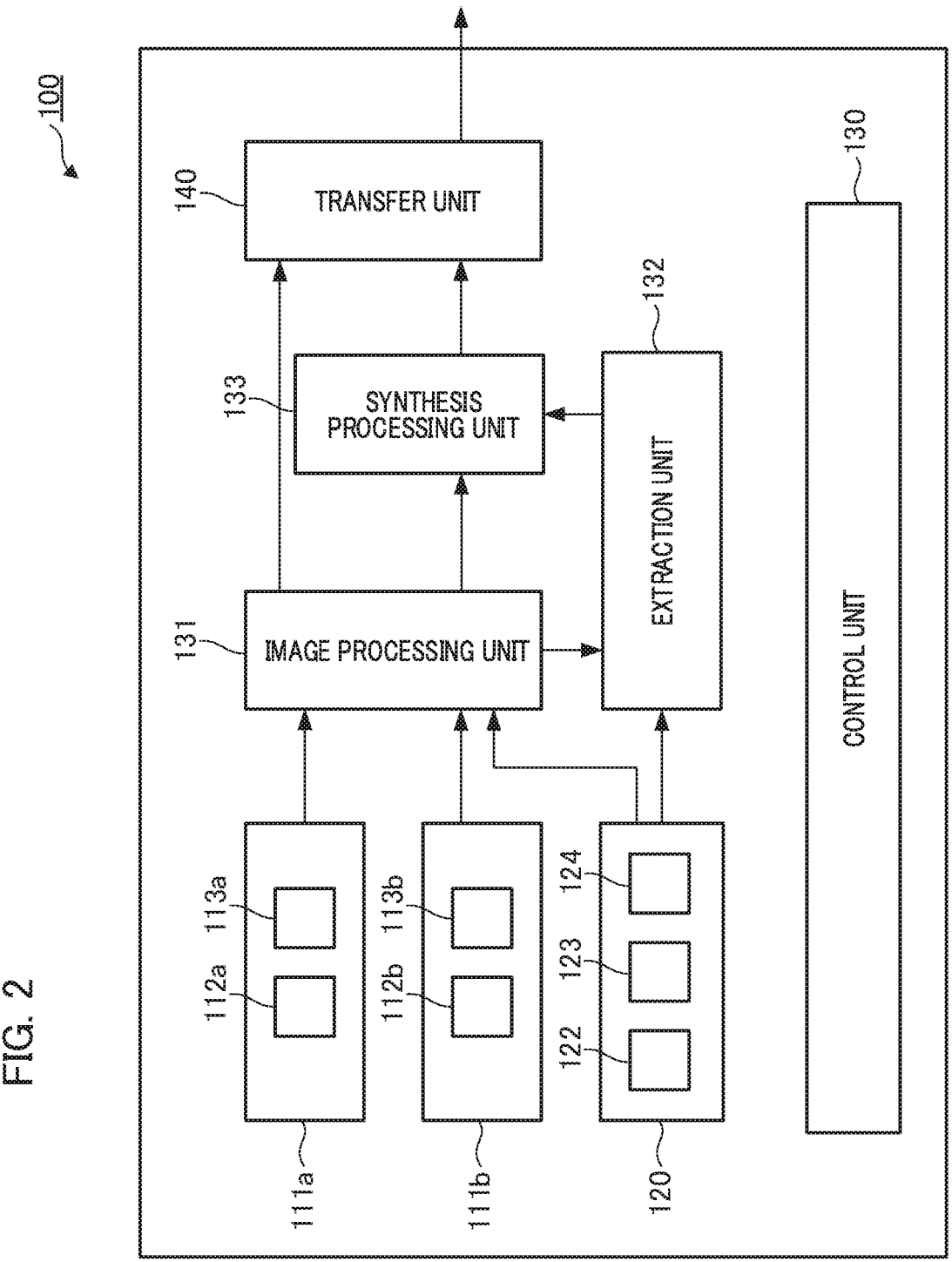
FIG. 2 is a diagram illustrating a configuration of the imaging apparatus.

FIG. 2 is a diagram illustrating a configuration of the imaging apparatus 100. The imaging apparatus 100 includes a control unit 130, an image processing unit 131, an extraction unit 132, a synthesis processing unit 133 and a transfer unit 140 in addition to the imaging unit 111a, the second imaging unit 111b and the third imaging unit 120. Meanwhile, although the imaging apparatus 100 is described by way of example in the present embodiment, the present invention may be realized by an image processing apparatus. The image processing apparatus includes the control unit 130, the image processing unit 131, the extraction unit 132, the synthesis processing unit 133 and the transfer unit 140, and performs various processes on images acquired from the imaging units.

The control unit 130 controls the entire imaging apparatus 100. The control unit 130 includes a central processing unit (CPU), and realizes various processes by reading out and executing a program stored in a non-volatile memory. The image processing unit 131 executes image processing such as demosaicing, defect correction, distortion correction, noise correction, magnification chromatic aberration correction, white balance adjustment, development processing, color conversion processing, encoding processing, or expansion and contraction processing on an image acquired by each of the imaging units.

The extraction unit 132 extracts a region of interest that is a region in which a subject of interest is present using at least one piece of information of the state of the third imaging unit 120 and the detailed image 102 that is a third image. The extraction unit 132 extracts a region of interest in accordance with, for example, the imaging range of the third imaging unit 120, a distance to a focus surface, a distance measuring frame, a photometric frame, the detection result of a subject, and the like.

The synthesis processing unit 133 synthesizes the first image acquired by the first imaging unit 111a and the second image acquired by the second imaging unit 111b, and generates the wide-angle image. Specifically, the synthesis processing unit 133 obtains the amount of positional shift between a plurality of images by applying a so-called pattern matching technique for obtaining correlation coefficients while shifting an overlap between the first image and the second image, and generates the wide-angle image. In addition, the synthesis processing unit 133 performs synthesis processing to reduce the possibility of a subject of interest appearing as a double image within a subject included in an imaging range in which the first imaging unit 111a and the second imaging unit 111b perform overlapping imaging. Meanwhile, the subject of interest is determined using at least one piece of information of the state of the third imaging unit 120 and the detailed image 102 acquired by the third imaging unit 120. The details of synthesis processing for generating a wide-angle image will be described later.

The transfer unit 140 is connected to an external client device through a network, and transfers an image captured by the imaging apparatus 100 to the client device, receives instructions from the client device, or performs communication with an external device. The client device is an external device such as, for example, a PC or an image processing apparatus. The network is, for example, a wired LAN, a wireless LAN, or the like. In addition, a configuration in which power is supplied to the imaging apparatus 100 through a network may be used.

The transfer unit 140 can transfer the wide-angle image and the detailed image which are captured by the imaging apparatus 100 in order through the same network. In addition, the external client device transmits a command for controlling the imaging apparatus 100 to the transfer unit 140, and the imaging apparatus 100 having received the command transmits a response to the command to the client device. Meanwhile, the transfer unit is not necessarily required to be connected to the client device, and, for example, the imaging apparatus 100 may include a memory that saves image data, a viewer that displays an image and an interface unit that accepts a user's command.

The first imaging unit 111a includes an imaging optical system 112a and an imaging element 113a. The first imaging unit 111a acquires an image by forming a subject image on the imaging element 113a through the imaging optical system 112a. Similarly, the second imaging unit 111b includes an imaging optical system 112b and an imaging element 113b. The second imaging unit 111b acquires an image by forming a subject image on the imaging element 113b through the imaging optical system 112b. Driving of the imaging optical system 112a and the imaging optical system 112b and signal read-out operations from the imaging element 113a and the imaging element 113b are controlled by the control unit 130.

The third imaging unit 120 includes an imaging optical system 122, an imaging element 123 and a drive mechanism 124. The third imaging unit 120 acquires an image by forming a subject image on the imaging element 123 through the imaging optical system 122. Driving of the imaging optical system 122 and a signal read-out operation from the imaging element 123 are controlled by the control unit 130.

Each of the imaging optical systems 112a, 112b, and 122 includes a plurality of lenses such as a shift lens or a zoom lens and a diaphragm. Each of the imaging elements 113a, 113b, and 123 is an imaging element such as a CCD or a CMOS, and receives light from a subject through the imaging optical system to convert the received light into an electrical signal using photoelectric conversion. Each of the imaging units 111a, 111b, and 120 converts the electrical signal into a digital signal, and acquires an image.

The drive mechanism 124 drives the third imaging unit 120, and changes the imaging direction thereof. The drive mechanism 124 includes, for example, a motor and a gear, and rotates the third imaging unit 120 around a specific rotary shaft by controlling electric power for driving the motor. In addition, although a case where the rotary shaft of the drive mechanism 124 is a Z-axis is described by way of example in the present embodiment, the drive mechanism may be configured to have a plurality of rotary shafts by providing a plurality of motors. Meanwhile, in order to accurately acquire information in the imaging direction of the third imaging unit 120, it is preferable that the drive mechanism 124 have an encoder.

Figure 3B:
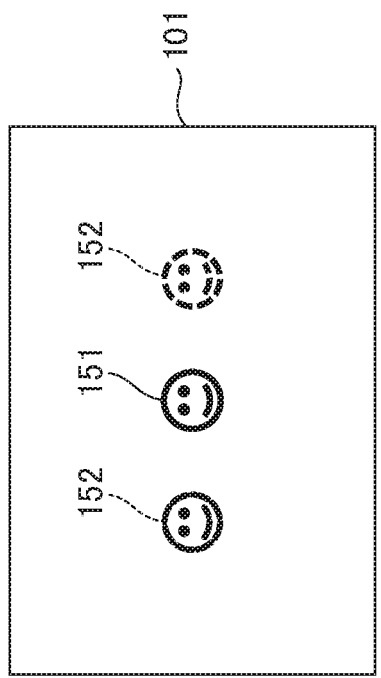
FIGS. 3A to 3C are diagrams illustrating the amounts of positional shift when a plurality of subjects having different distances are imaged.
Figure 3C:
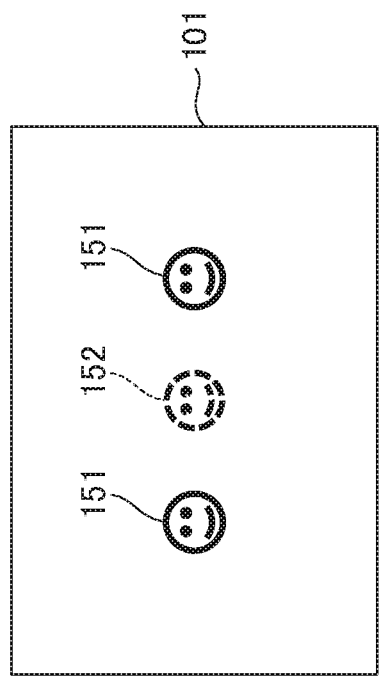
Figure 3A:
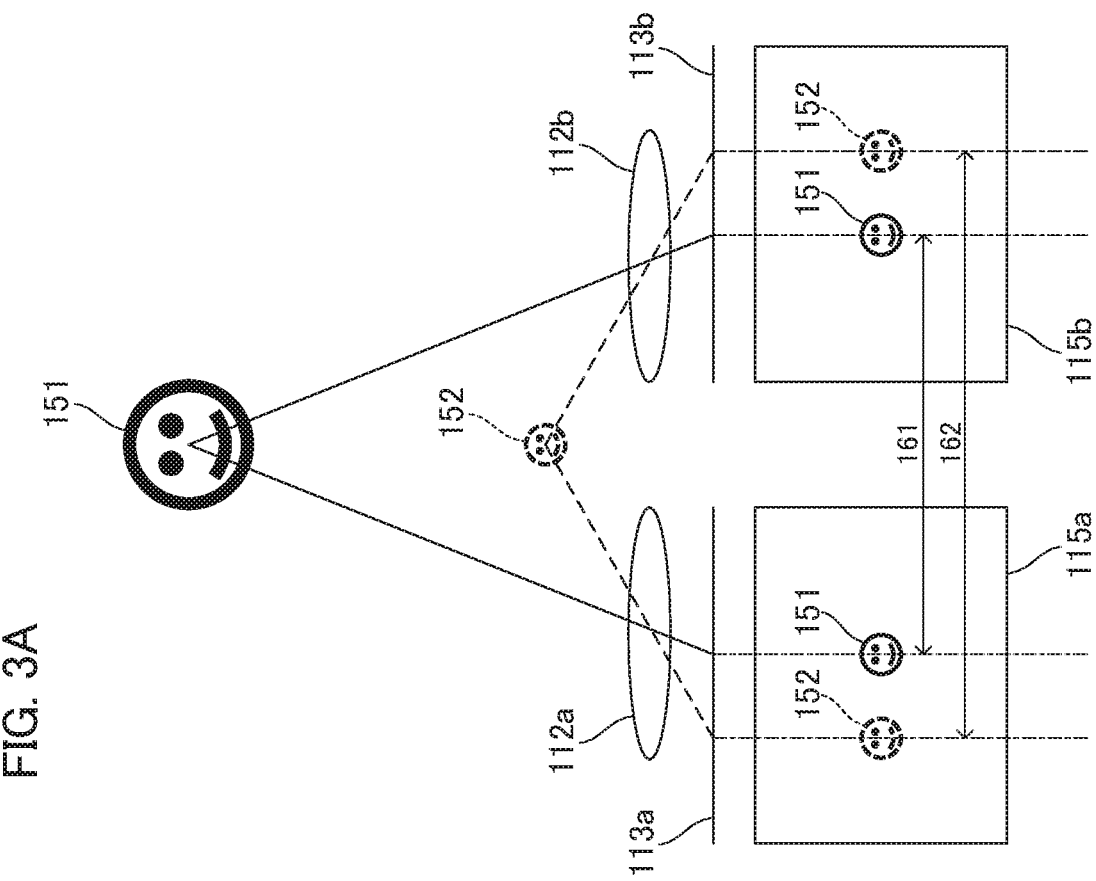

FIGS. 3A to 3C are diagrams illustrating a relationship between the imaging apparatus 100 and a generated wide-angle image 101. FIG. 3A is a diagram illustrating images which are acquired if subjects having different distances from the imaging apparatus 100 are imaged. A subject 151 is a subject located at a long distance from the imaging apparatus 100, and a subject 152 is a subject located at a short distance from the imaging apparatus 100. A first image 115a is an image captured by the first imaging unit 111a. A second image 115b is an image captured by the second imaging unit 111b. As shown in FIG. 3A, in the case of the subject 151 located at a long distance, the amount of positional shift 161 between the first image 115a and the second image 115b is small. On the other hand, in the case of the subject 152 located at a short distance, the amount of positional shift 162 between the first image 115a and the second image 115b is large.

In the synthesis processing unit 133, if the wide-angle image 101 is generated by synthesizing the first image 115a and the second image 115b shown in FIG. 3A so that specific subjects overlap each other, an image of FIG. 3B or 3C is generated. FIG. 3B is a diagram illustrating an example of the wide-angle image 101 synthesized so that the subjects 151 located at a long distance from the imaging apparatus 100 overlap each other. FIG. 3C is a diagram illustrating an example of the wide-angle image 101 synthesized so that the subjects 152 located at a short distance from the imaging apparatus 100 overlap each other.

As shown in FIG. 3B, if the first image 115a and the second image 115b are superimposed by being shifted by the amount of positional shift 161 so that the subjects 151 overlap each other to generate the wide-angle image 101, the subject 152 appears as a double image. On the other hand, as shown in FIG. 3C, if the first image 115a and the second image 115b are superimposed by being shifted by the amount of positional shift 162 so that the subjects 152 overlap each other to generate the wide-angle image 101, the subject 151 appears as a double image. In this manner, if a plurality of subjects having different distances are imaged, any of the subjects appears as a double image in the generated wide-angle image 101. Particularly, if a subject of interest appears as a double image, the visibility of the wide-angle image 101 decreases.

Consequently, in the present embodiment, the extraction unit 132 extracts a region of interest which is used in synthesis processing, and the synthesis processing unit 133 adjusts the amount of positional shift between the first image 115a and the second image 115b to synthesize the images so that the region of interest does not appear as a double image. Meanwhile, in order to obtain the amount of positional shift at which a subject within an extracted region of interest 126 does not appear as a double image, for example, a general method such as template matching may be used. For example, correlation coefficients may be calculated with respect to the region of interest 126 while shifting the first image 115a and the second image 115b, and the amount of positional shift having a highest correlation coefficient may be obtained. The correlation coefficient is obtained by, for example, a sum of squared differences (SSD), a sum of absolute differences (SAD), or the like.

In the first embodiment, the extraction unit 132 extracts a region of interest on the basis of the imaging direction of the third imaging unit 120. The imaging direction is the direction of the optical axis of the imaging optical system 122 of the third imaging unit 120. In the present embodiment, an image, acquired by the third imaging unit 120, which is used in extracting a region of interest is called the detailed image 102. The detailed image 102 for extracting a region of interest includes at least a part of the imaging range in which the first imaging unit 111a and the second imaging unit 111b perform overlapping imaging in the imaging range thereof. There are cases where the detailed image 102 which is acquired by the third imaging unit 120 is used as an enlarged image in the wide-angle image 101 and is used as a supplementary image for supplementing the wide-angle image 101. Hereinafter, the generation of the wide-angle image in each case will be described.

First, a case where the detailed image 102 is desired to be used as an enlarged image in the wide-angle image 101 will be described. In this case, since it is necessary to accurately ascertain a correspondence relation between subjects captured in the detailed image 102 and the wide-angle image 101, it is preferable to reduce the possibility of a subject in a range of the wide-angle image 101 which is also included within the imaging range of the detailed image 102 appearing as a double image. Therefore, a region included in an imaging angle of view 127 of the third imaging unit 120 within the imaging range in which the first imaging unit 111a and the second imaging unit 111b perform overlapping imaging may be set as the region of interest 126.

FIGS. 4A and 4B are diagrams illustrating a relationship between the imaging apparatus 100 and a generated wide-angle image 101 and the detailed image 102. In FIGS. 4A and 4B, the imaging directions of the third imaging unit 120 are different from each other. The imaging angle of view 127 indicates the imaging angle of view of the third imaging unit 120. FIG. 4A shows a case where the subject 151 located at a long distance from the imaging apparatus 100 is included in the imaging angle of view 127 of the third imaging unit 120, and the subject 152 located at a short distance is not included. On the other hand, FIG. 4B is a case where the subject 152 located at a short distance from the imaging apparatus 100 is included in the imaging angle of view 127 of the third imaging unit 120, and the subject 151 located at a long distance is not included.

The extraction unit 132 extracts a region included in the imaging angle of view 127 of the third imaging unit 120 as the region of interest 126. Therefore, in FIG. 4A, the synthesis processing unit 133 synthesizes the first image 115a and the second image 115b so that the subject 151 included in the region of interest 126, that is, the imaging angle of view 127, does not appear as a double image, and generates the wide-angle image 101. Therefore, the synthesis processing unit 133 superimposes the first image 115a and the second image 115b by shifting the images by an amount of positional shift 161 so that the subjects 151 overlap each other to generate the wide-angle image 101.

On the other hand, in FIG. 4B, the synthesis processing unit 133 synthesizes the first image 115a and the second image 115b so that the subject 152 included in the region of interest 126, that is, the imaging angle of view 127, does not appear as a double image, and generates the wide-angle image 101. Therefore, the synthesis processing unit 133 superimposes the first image 115a and the second image 115b by shifting the images by an amount of positional shift 162 so that the subjects 152 overlap each other to generate the wide-angle image 101.

In this manner, the region included in the imaging angle of view 127 of the third imaging unit 120 is set as the region of interest 126, whereby it is possible to reduce the possibility of a subject in a range of the wide-angle image 101 which is also included within the imaging range of the detailed image 102 appearing as a double image. As a result, it is possible to improve the visibility of the wide-angle image 101 in a case where the detailed image 102 is desired to be used as an enlarged image in the wide-angle image 101.

Next, a case where the detailed image 102 is desired to be used as an image for supplementing and monitoring the wide-angle image 101 will be described. In this case, it is preferable to improve the visibility of a subject in a range of the wide-angle image 101 which is not included within the imaging range of the detailed image 102. Therefore, the extraction unit 132 sets a region which is not included in the imaging angle of view 127 of the third imaging unit 120 within the imaging range in which the first imaging unit 111a and the second imaging unit 111b perform overlapping imaging as the region of interest 126.

Figure 5B:
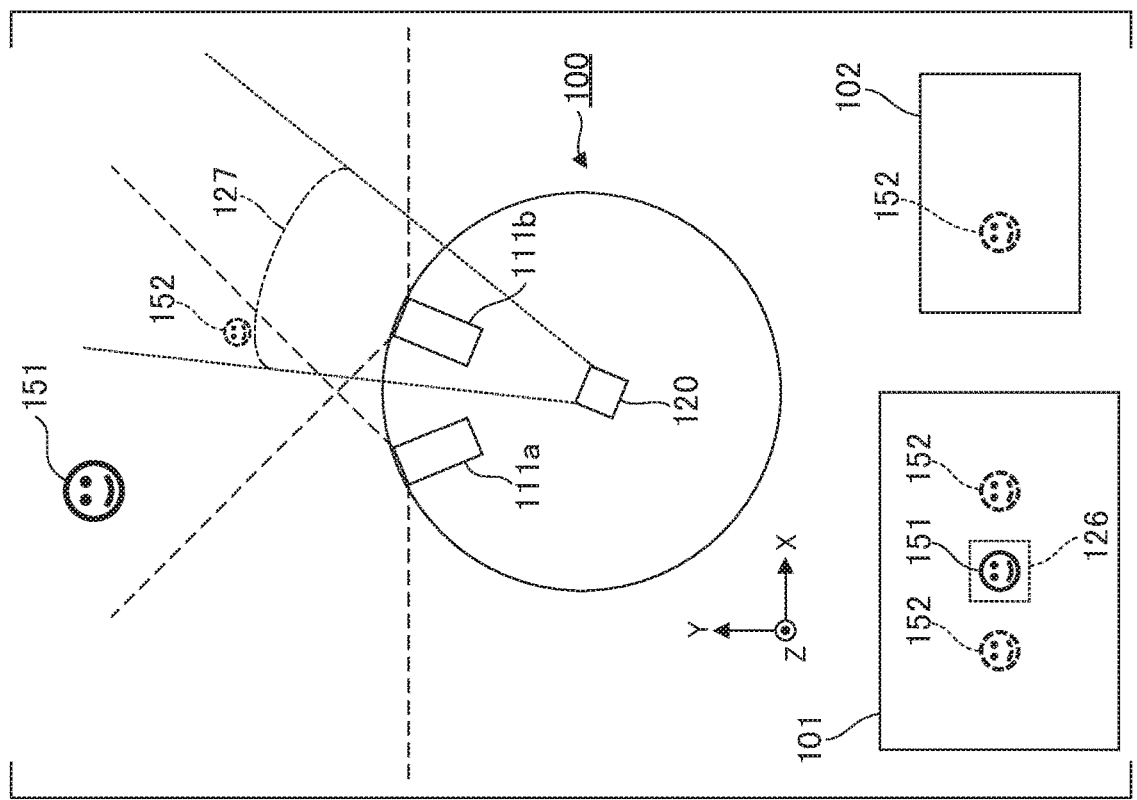
FIGS. 5A and 5B are diagrams illustrating a relationship between the imaging apparatus and a generated wide-angle image.
Figure 5A:
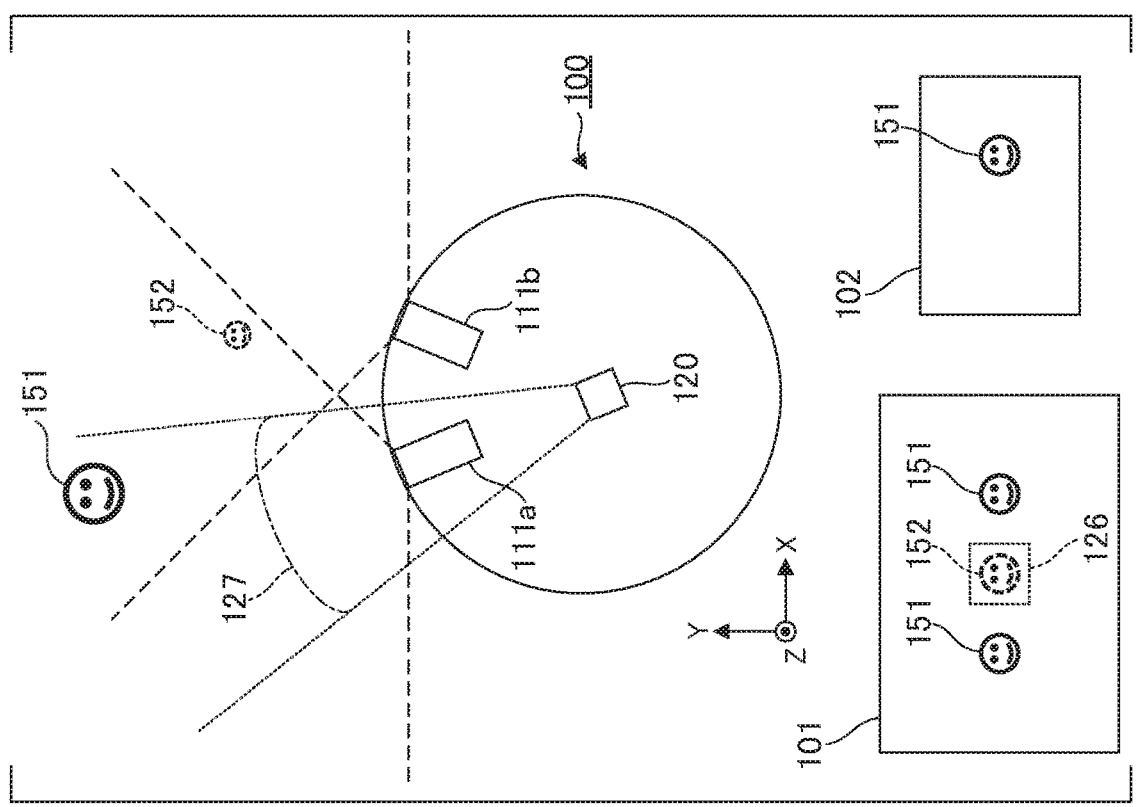

FIGS. 5A and 5B are diagrams illustrating a relationship between the imaging apparatus 100 and the wide-angle image 101 and the detailed image 102 which are generated. In FIGS. 5A and 5B, the imaging directions of the third imaging unit 120 are different from each other. FIG. 5A shows a case where the subject 151 located at a long distance from the imaging apparatus 100 is included in the imaging angle of view 127 of the third imaging unit 120, and the subject 152 located at a short distance is not included. On the other hand, FIG. 5B shows a case where the subject 152 located at a short distance from the imaging apparatus 100 is included in the imaging angle of view 127 of the third imaging unit 120, and the subject 151 located at a long distance is not included.

An image which is acquired by each imaging unit in FIG. 5A is the same as the image which is acquired by each imaging unit in FIG. 4A. Similarly, an image which is acquired by each imaging unit in FIG. 5B is the same as the image which is acquired by each imaging unit in FIG. 4B. However, in FIGS. 5A and 5B, the extraction unit 132 extracts a region which is not included in the imaging angle of view 127 of the third imaging unit 120 as the region of interest 126. Therefore, the generated wide-angle images 101 are different from each other in FIGS. 5A and 4A, and are also different from each other in FIGS. 5B and 4B similarly.

In FIG. 5A, the synthesis processing unit 133 synthesizes the first image 115a and the second image 115b so that the subject 152 included in the region of interest 126 which is out of the imaging angle of view 127 of the third imaging unit 120 does not appear as a double image, and generates the wide-angle image 101. Therefore, the synthesis processing unit 133 superimposes the first image 115a and the second image 115b by shifting the images by an amount of positional shift 162 so that the subjects 152 overlap each other to generate the wide-angle image 101.

In FIG. 5B, the synthesis processing unit 133 synthesizes the first image 115a and the second image 115b so that the subject 151 included in the region of interest 126 which is out of the imaging angle of view 127 of the third imaging unit 120 does not appear as a double image, and generates the wide-angle image 101. Therefore, the synthesis processing unit 133 superimposes the first image 115a and the second image 115b by shifting the images by an amount of positional shift 161 so that the subjects 151 overlap each other to generate the wide-angle image 101.

In this manner, the region which is not included in the imaging angle of view 127 of the third imaging unit 120 is set as the region of interest 126, whereby it is possible to reduce the possibility of a subject in a range of the wide-angle image 101 which is not also included within the imaging range of the detailed image 102 appearing as a double image. As a result, it is possible to improve the visibility of the wide-angle image 101 in a case where the detailed image 102 is desired to be used as an image for supplementing and monitoring the wide-angle image 101.

Meanwhile, as in the present embodiment, when the wide-angle image 101 is generated so that the region of interest 126 does not appear as a double image, there is the possibility of a subject other than the region of interest 126 appearing as a double image. Specifically, if the amount of positional shift of a subject other than the region of interest 126 between the first image 115a and the second image 115b is different from the amount of positional shift of a subject in the region of interest 126 between the first image 115a and the second image 115b, the region appears as a double image. Consequently, regarding a region appearing as a double image, when the wide-angle image 101 is generated, it is preferable to make a double image inconspicuous by adding blur while simultaneously superimposing the first image 115a and the second image 115b by shifting the images. Specifically, low-pass filtering may be performed on a region of a subject other than the region of interest 126. Addition averaging or thinning may be performed between pixels adjacent to each other by low-pass filtering, or an arithmetic operation may be performed after conversion into a frequency space.

As describe above, according to the present embodiment, it is possible to generate the wide-angle image 101 by setting the region of interest 126 used in synthesis processing in accordance with the imaging direction (imaging range) of the third imaging unit 120 and synthesizing a plurality of images so as to superimpose subjects within the region of interest 126. Thereby, it is possible to reduce the possibility of a subject of interest appearing as a double image, and to improve the visibility of the wide-angle image 101.

Second Embodiment

An imaging apparatus 200 in a second embodiment includes a first imaging unit 211a, a second imaging unit 211b and a third imaging unit 220. The imaging apparatus 200 has the same configuration as that of the imaging apparatus 100 of the first embodiment, but has a different configuration of the third imaging unit 220. Specifically, the third imaging unit 220 of the imaging apparatus 200 has a zoom control mechanism capable of changing an imaging angle of view instead of the drive mechanism 124 capable of changing an imaging direction which is included in the third imaging unit 120 of the imaging apparatus 100. The zoom control mechanism includes a motor and a gear, and changes a zoom ratio by moving some lenses within the imaging optical system 122 of the third imaging unit 220 in an optical axis direction.

In the second embodiment, the extraction unit 132 extracts a region of interest 226 on the basis of the imaging angle of view of the third imaging unit 220. Generally, as a subject located at a longer distance from the imaging apparatus is imaged, the subject is required to be imaged more enlargedly, and thus the imaging angle of view becomes narrower. Therefore, it can be determined that, as the imaging angle of view of the third imaging unit 220 becomes narrower, a user mainly images a subject located at a longer distance. There are cases where a detailed image 202 which is acquired by the third imaging unit 220 is used as an enlarged image in the wide-angle image 201 and is used as a supplementary image for supplementing the wide-angle image 201. Hereinafter, the generation of the wide-angle image in each case will be described.

Figure 6A:
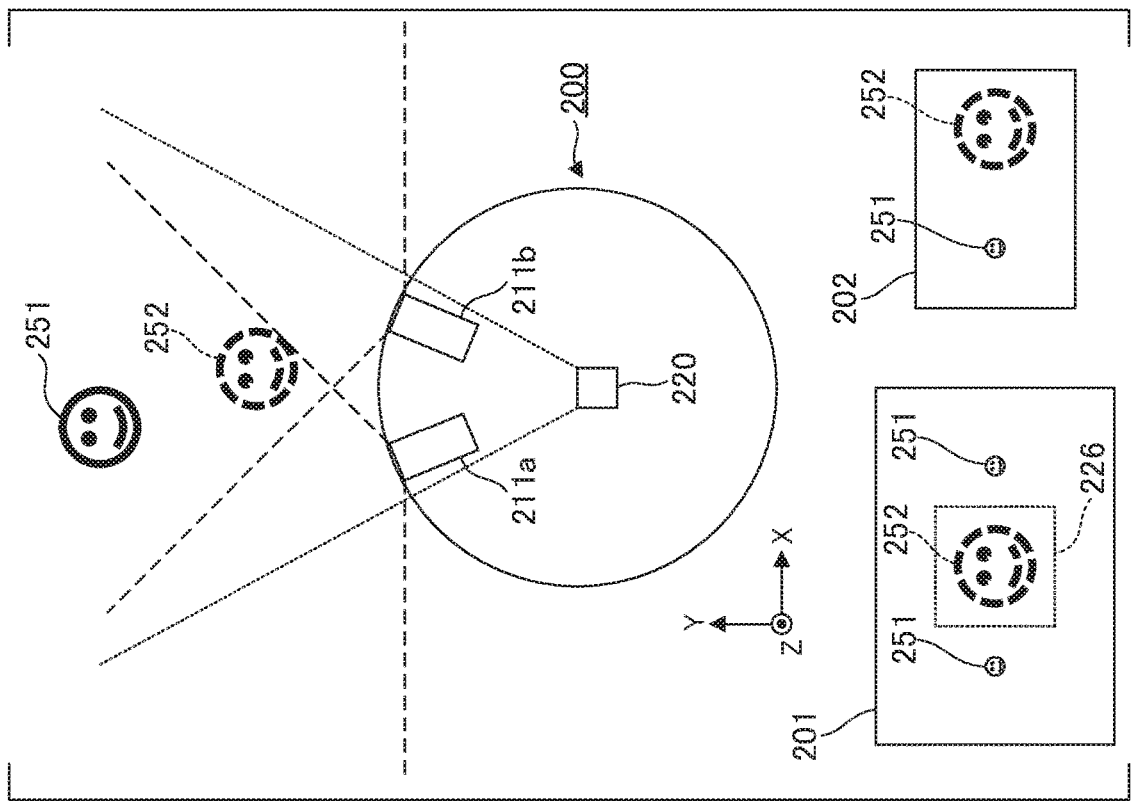
FIGS. 6A and 6B are diagrams illustrating a relationship between the imaging apparatus and a generated wide-angle image.
Figure 6B:
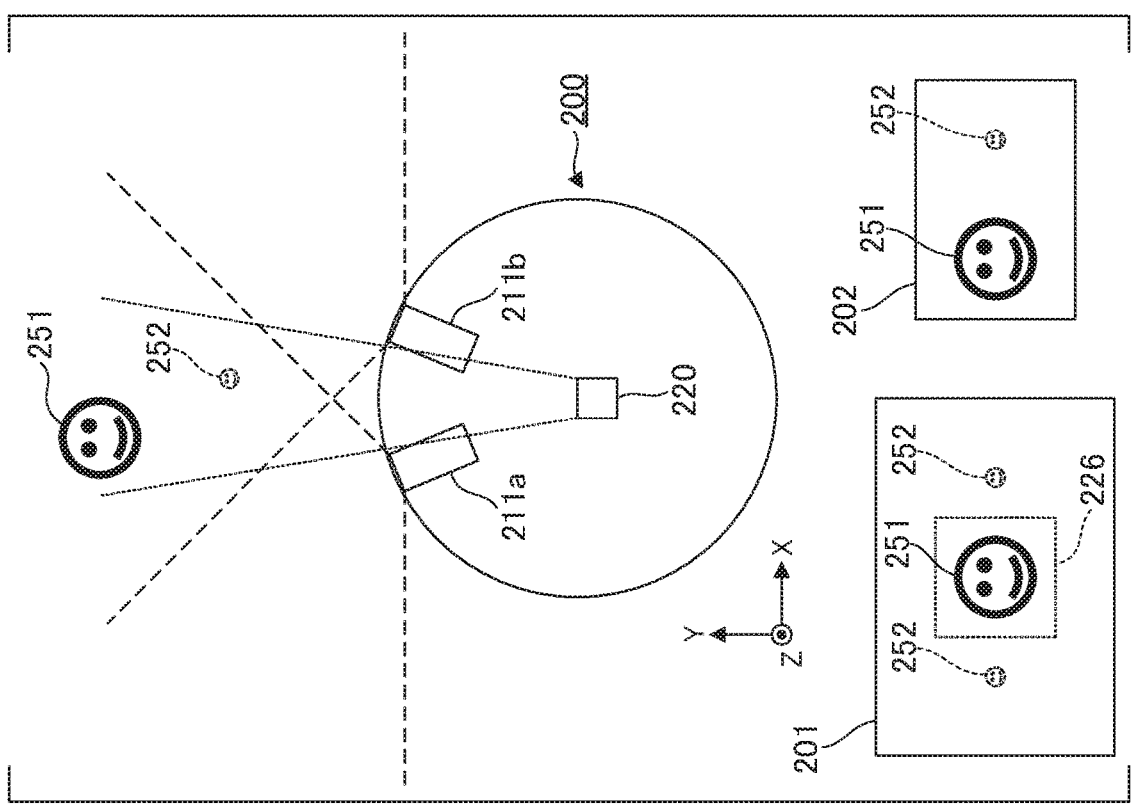

First, a case where the detailed image 202 is used as an enlarged image of the wide-angle image 201 will be described. In this case, when the wide-angle image 201 is generated, it is preferable to reduce the possibility of a subject which is mainly imaged by the third imaging unit 220 appearing as a double image. FIGS. 6A and 6B are diagrams illustrating a relationship between the imaging apparatus 200 and the wide-angle image 201 and the detailed image 202 which are generated. In FIGS. 6A and 6B, the imaging angles of view of the third imaging unit 220 are different from each other. FIG. 6A shows a case where the imaging angle of view of the third imaging unit 220 is narrow. On the other hand, FIG. 6B shows a case where the imaging angle of view of the third imaging unit 220 is wide.

In the case of FIG. 6A, since the imaging angle of view of the third imaging unit 220 is narrow, it can be determined that the third imaging unit 220 images a subject 251 located at a long distance from the imaging apparatus 200. Therefore, the extraction unit 132 extracts a range in which the subject 251 located at a long distance from the imaging apparatus 200 is imaged within an imaging range in which the first imaging unit 211a and the second imaging unit 211b perform overlapping imaging as the region of interest 226. The synthesis processing unit 133 adjusts the amount of positional shift between a first image and a second image so that the subject 251 in the region of interest 226 does not appear as a double image, and generates the wide-angle image 201. Meanwhile, since the subject 251 is located at a long distance from the imaging apparatus 200, the range in which the subject is imaged is a range having a small amount of positional shift between the first image and the second image. Therefore, if the detailed image 202 is used as an enlarged image, as the imaging angle of view of the third imaging unit 220 becomes narrower, the extraction unit 132 may extract a region having a smaller amount of positional shift between the first image and the second image as the region of interest 226.

In the case of FIG. 6B, since the imaging angle of view of the third imaging unit 220 is wide, it can be determined that the third imaging unit 220 images a subject 252 located at a short distance from the imaging apparatus 200. Therefore, the extraction unit 132 extracts a range in which the subject 252 located at a short distance from the imaging apparatus 200 is imaged within the imaging range in which the first imaging unit 211a and the second imaging unit 211b perform overlapping imaging as the region of interest 226. The synthesis processing unit 133 adjusts the amount of positional shift between the first image and the second image so that the subject 252 in the region of interest 226 does not appear as a double image, and generates the wide-angle image 201. Meanwhile, since the subject 252 is located at a short distance from the imaging apparatus 200, the range in which the subject is imaged is a range having a large amount of positional shift between the first image and the second image. Therefore, if the detailed image 202 is used as an enlarged image, as the imaging angle of view of the third imaging unit 220 becomes wider, the extraction unit 132 may extract a region having a larger amount of positional shift between the first image and the second image as the region of interest 226.

In this manner, if the detailed image 202 is used as an enlarged image, as the imaging angle of view of the third imaging unit 220 becomes narrower, a range having a smaller amount of positional shift between images used to synthesize the wide-angle image 201 is extracted as the region of interest 226. Thereby, it is possible to reduce the possibility of a subject which is mainly imaged by the third imaging unit 220 appearing as a double image in the wide-angle image 201, and to improve the visibility of the wide-angle image 201 in a case where the detailed image 202 is desired to be used as an enlarged image of the wide-angle image 201.

Next, a case Where the detailed image 202 is used as an image for supplementing and monitoring the wide-angle image 201 will be described. In this case, when the wide-angle image 201 is generated, it is preferable to reduce the possibility of a subject separate from the subject which is mainly imaged by the third imaging unit 220 appearing as a double image. FIGS. 7A and 7B are diagrams illustrating a relationship between the imaging apparatus 200 and the wide-angle image 201 and the detailed image 202 which are generated. In FIGS. 7A and 7B, the imaging angles of view of the third imaging unit 220 are different from each other. FIG. 7A shows a case where the imaging angle of view of the third imaging unit 220 is narrow. On the other hand, FIG. 7B shows a case where the imaging angle of view of the third imaging unit 220 is wide.

In the case of FIG. 7A, since the imaging angle of view of the third imaging unit 220 is narrow, it can be determined that the third imaging unit 220 image the subject 251 located at a long distance from the imaging apparatus 200. Therefore, the extraction unit 132 extracts a range in which the subject 252 different from the subject 251 is imaged within the imaging range in which the first imaging unit 211a and the second imaging unit 211b perform overlapping imaging as the region of interest 226. The synthesis processing unit 133 adjusts the amount of positional shift between the first image and the second image so that the subject 252 in the region of interest 226 does not appear as a double image, and generates the wide-angle image 201. Meanwhile, since the subject 252 is located at a short distance from the imaging apparatus 200, the range in which the subject is imaged is a range having a large amount of positional shift between the first image and the second image. Therefore, if the detailed image 202 is used as a supplementary image, as the imaging angle of view of the third imaging unit 220 becomes narrower, the extraction unit 132 may extract a region having a larger amount of positional shift between the first image and the second image as the region of interest 226.

In the case of FIG. 7B, since the imaging angle of view of the third imaging unit 220 is wide, it can be determined that the third imaging unit 220 images the subject 252 located at a short distance from the imaging apparatus 200. Therefore, the extraction unit 132 extracts a range in which the subject 251 different from the subject 252 is imaged within the imaging range in which the first imaging unit 211a and the second imaging unit 211b perform overlapping imaging as the region of interest 226. The synthesis processing unit 133 adjusts the amount of positional shift between a first image and a second image so that the subject 251 in the region of interest 226 does not appear as a double image, and generates the wide-angle image 201. Meanwhile, since the subject 251 is located at a long distance from the imaging apparatus 200, the range in which the subject is imaged is a range in which the amount of positional shift between the first image and the second image is small. Therefore, if the detailed image 202 is used as a supplementary image, as the imaging angle of view of the third imaging unit 220 becomes wider, the extraction unit 132 may extract a region having a smaller amount of positional shift between the first image and the second image as the region of interest 226.

In this manner, if the detailed image 202 is used as a supplementary image, as the imaging angle of view of the third imaging unit 220 becomes narrower, a range having a larger the amount of positional shift between images used to synthesize the wide-angle image 201 is extracted as the region of interest 226. Thereby, it is possible to reduce the possibility of a subject separate from the subject which is mainly imaged by the third imaging unit 220 appearing as a double image in the wide-angle image 201, and to improve the visibility of the wide-angle image 201 in a case where the detailed image 202 is desired to be used as a supplementary image of the wide-angle image 201.

As described above, according to the present embodiment, it is possible to generate the wide-angle image 201 by selling the region of interest 226 used in synthesis processing in accordance with the imaging angle of view of the third imaging unit 220 and synthesizing a plurality of images so as to superimpose subjects within the region of interest 226. In addition, according to first embodiment and the second embodiment, the extraction unit 132 extracts a region of interest on the basis of the imaging range of the detailed image such as an imaging direction or the imaging angle of view. Thereby, it is possible to reduce the possibility of a subject of interest appearing as a double image, and to improve the visibility of the wide-angle image 201.

Third Embodiment

An imaging apparatus 300 in a third embodiment includes a first imaging unit 311a, a second imaging unit 311b and a third imaging unit 320. The imaging apparatus 300 has the same configuration as that of the imaging apparatus 100 of the first embodiment, but has a different configuration of the third imaging unit 320. Specifically, the third imaging unit 320 of the imaging apparatus 300 has a focus control mechanism capable of changing a back focus distance instead of the drive mechanism 124 capable of changing an imaging direction which is included in the third imaging unit 120 of the imaging apparatus 100. A focusing mechanism 324 includes, for example, a motor and a gear, and changes a back focus distance by moving some lenses within the imaging optical system 122 of the third imaging unit 320 in an optical axis direction.

The extraction unit 132 of the imaging apparatus 300 extracts a region of interest 326 on the basis of a distance from a subject having the region of interest 326 imaged by the third imaging unit 320 to a focus surface. Generally, as a subject becomes more distant from a focus surface, the definition of an image becomes lower due to blur. Therefore, it can be determined that a user mainly images a subject which has small blur and is close to a focus surface using the third imaging unit 320. As described above, the amount of positional shift between the first image captured by the first imaging unit 311a and the second image captured by the second imaging unit 311b changes depending on a distance from the imaging apparatus 300 to a subject. There are cases where a detailed image 302 which is acquired by the third imaging unit 320 is used as an enlarged image in the wide-angle image 301 and is used as a supplementary image for supplementing the wide-angle image 301. Hereinafter, the generation of the wide-angle image in each case will be described.

Figure 8A:
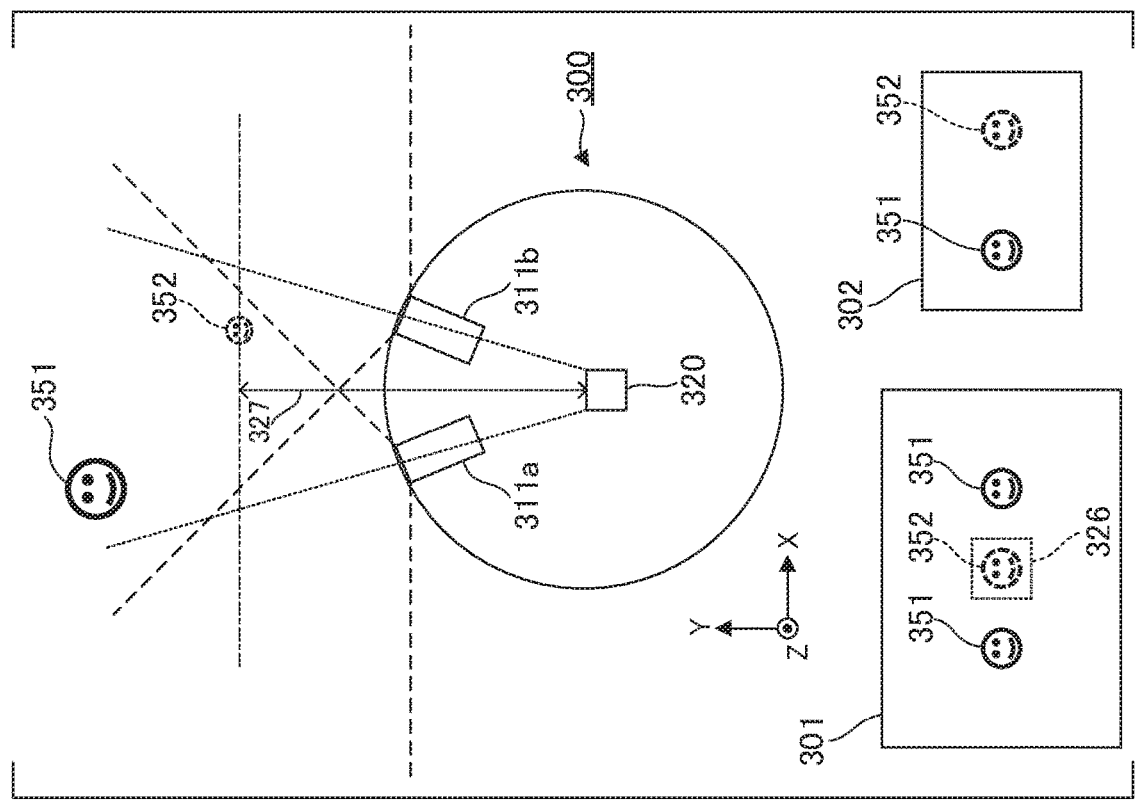
FIGS. 8A and 8B are diagrams illustrating a relationship between the imaging apparatus and a generated wide-angle image.
Figure 8B:
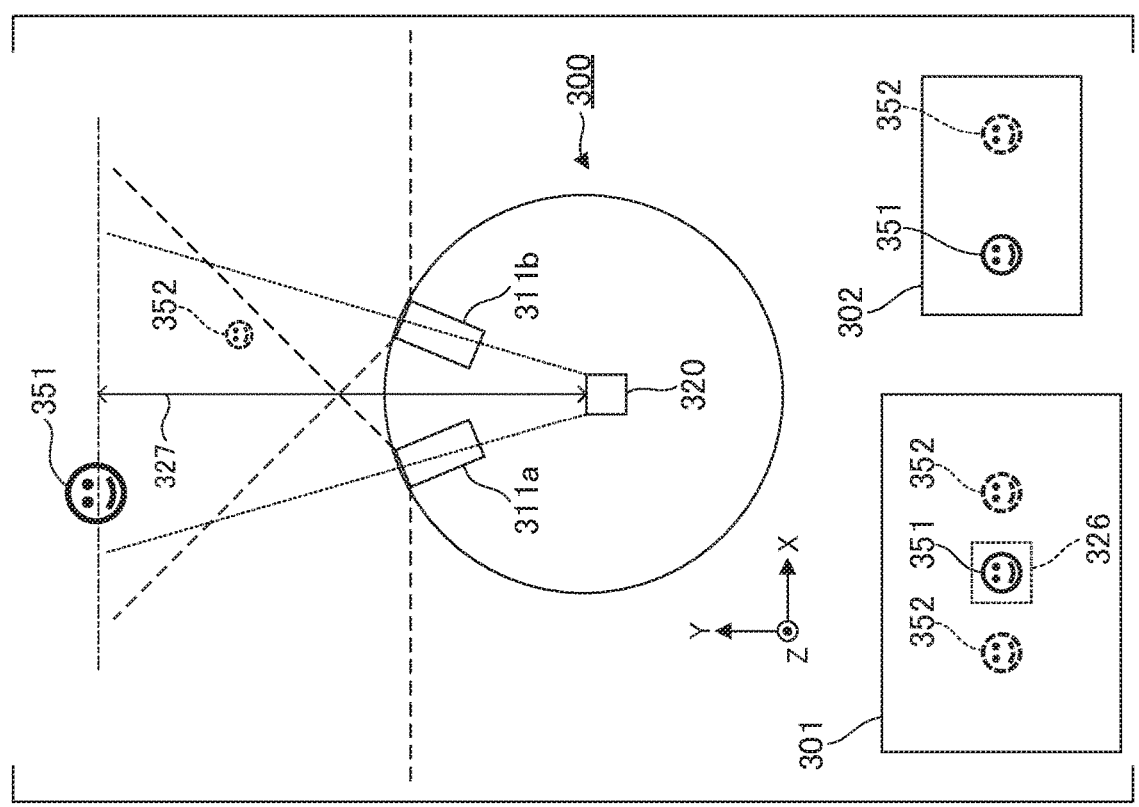

First, a case where the detailed image 302 is used as an enlarged image of the wide-angle image 301 will be described. In this case, when the wide-angle image 301 is generated, it is preferable to reduce the possibility of a subject which is mainly imaged by the third imaging unit 320 appearing as a double image. FIGS. 8A and 8B are diagrams illustrating a relationship between the imaging apparatus 300 and the wide-angle image 301 and the detailed image 302 which are generated. In FIGS. 8A and 8B, distances 327 from the third imaging unit 320 to a focus surface are different from each other. FIG. 8A shows a case where the distance 327 from the third imaging unit 320 to a focus surface is coincident with a distance from the third imaging unit 320 to a subject 351. On the other hand, FIG. 8B shows a case where the distance 327 from the third imaging unit 320 to a focus surface is coincident with a distance from the third imaging unit 320 to a subject 352.

In the case of FIG. 8A, since the distance 327 from the third imaging unit 320 to a focus surface is coincident with the distance from the third imaging unit 320 to the subject 351, it can be determined that the third imaging unit 320 images the subject 351. Therefore, the extraction unit 132 extracts a range in which the subject 351 is imaged within an imaging range in which the first imaging unit 311a and the second imaging unit 311b perform overlapping imaging as the region of interest 326. The synthesis processing unit 133 adjusts the amount of positional shift between the first image and the second image so that the subject 351 in the region of interest 326 does not appear as a double image, and generates the wide-angle image 301. Meanwhile, since there is a high possibility that a user images a subject located on a focus surface using the third imaging unit 320, it is more preferable that the extraction unit 132 set a range coincident with the distance 327 from the third imaging unit 320 to a focus surface as the region of interest 326.

In the case of FIG. 8B, since the distance 327 from the third imaging unit 320 to a focus surface is coincident with the distance from the third imaging unit 320 to the subject 352, it can be determined that the third imaging unit 320 images the subject 352. Therefore, the extraction unit 132 extracts a range in which the subject 352 is imaged within the imaging range in which the first imaging unit 311a and the second imaging unit 311b perform overlapping imaging as the region of interest 326. The synthesis processing unit 133 adjusts the amount of positional shift between the first image and the second image so that the subject 352 in the region of interest 326 does not appear as a double image, and generates the wide-angle image 301. Meanwhile, since there is a high possibility that a user images a subject located on a focus surface using the third imaging unit 320, it is more preferable that the extraction unit 132 set a range coincident with the distance 327 from the third imaging unit 320 to a focus surface as the region of interest 326.

That is, if the distance 327 from the third imaging unit 320 to a focus surface is far from the imaging apparatus 300 as shown in FIG. 8A, the amount of positional shift between images when the wide-angle image 301 is generated is reduced so that the subject 351 does not appear as a double image. On the other hand, if the distance 327 from the third imaging unit 320 to a focus surface is close to the imaging apparatus 300 as shown in FIG. 8B, the amount of positional shift between images when the wide-angle image 301 is generated is increased so that the subject 352 does not appear as a double image.

In this manner, the region of interest 326 is set in accordance with a distance relationship between a subject and a focus surface when the detailed image 302 is captured, whereby it is possible to reduce the possibility of the subject which is mainly imaged by the third imaging unit 320 in the wide-angle image 301 appearing as a double image. As a result, it is possible to improve the visibility of the wide-angle image 301 in a case where the detailed image 302 is used as an enlarged image of the wide-angle image 301.

Figure 9B:
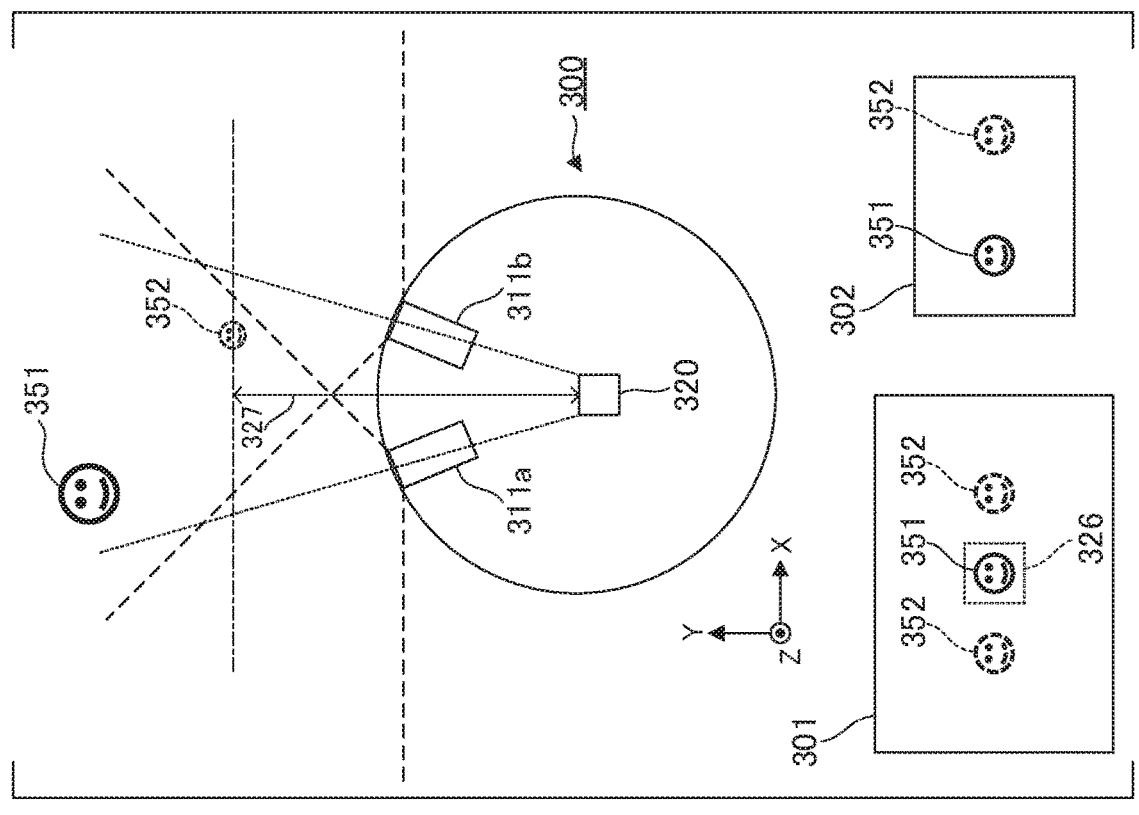
FIGS. 9A and 9B are diagrams illustrating a relationship between the imaging apparatus and a generated wide-angle image.
Figure 9A:
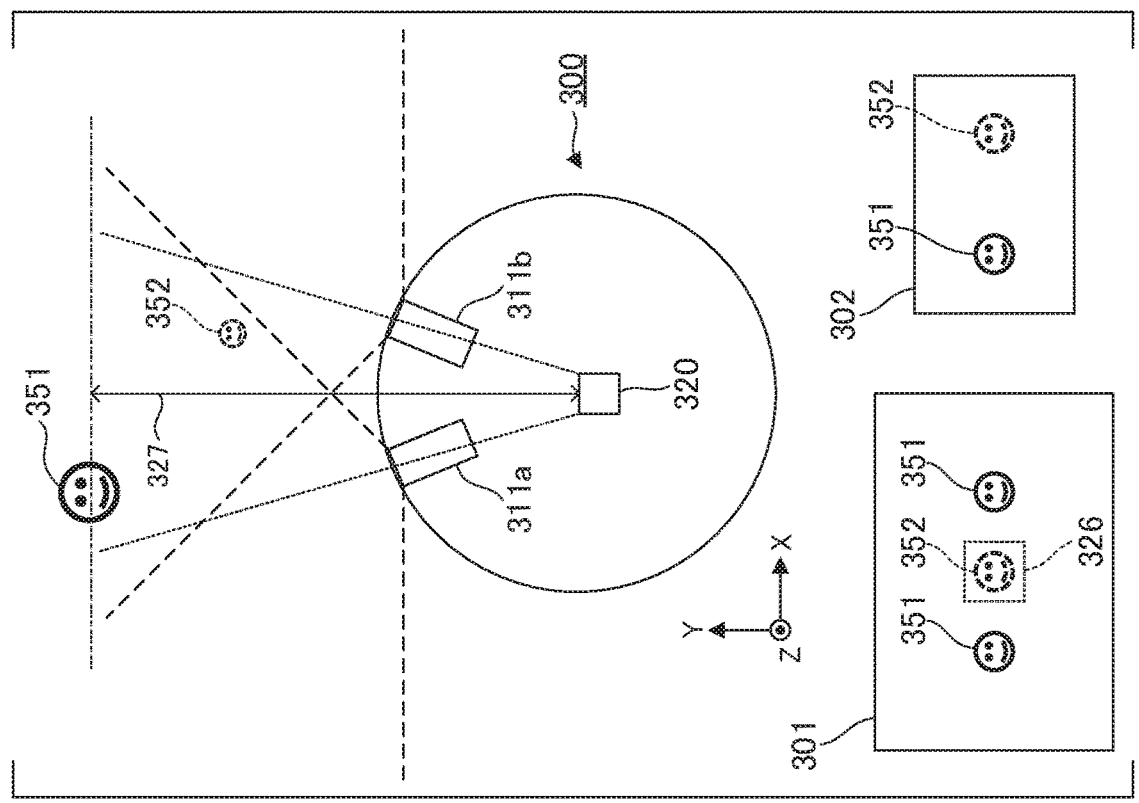

Next, a case where the detailed image 302 is used as an image for supplementing and monitoring the wide-angle image 301 will be described. In this case, it is preferable to reduce the possibility of a subject separate from the subject which is mainly imaged by the third imaging unit 320 in the wide-angle image 301 appearing as a double image. FIGS. 9A and 9B are diagrams illustrating a relationship between the imaging apparatus 300 and the wide-angle image 301 and the detailed image 302 which are generated. In FIGS. 9A and 9B, the distances 327 from the third imaging unit 320 to a focus surface are different from each other. FIG. 94 shows a case where the distance 327 from the third imaging unit 320 to a focus surface is coincident with the distance from the third imaging unit 320 to the subject 351. On the other hand. FIG. 9B shows a case where the distance 327 from the third imaging unit 320 to a focus surface is coincident with the distance from the third imaging unit 320 to the subject 352.

In the case of FIG. 9A, since the distance 327 from the third imaging unit 320 to a focus surface is coincident with the distance from the third imaging unit 320 to the subject 351, it can be determined that the third imaging unit 320 images the subject 351. Therefore, the extraction unit 132 extracts a range in which the subject 352 is imaged within the imaging range in which the first imaging unit 311a and the second imaging unit 311b perform overlapping imaging as the region of interest 326. The synthesis processing unit 133 adjusts the amount of positional shift between the first image and the second image so that the subject 352 in the region of interest 326 does not appear as a double image, and generates the wide-angle image 301.

In the case of FIG. 9B, since the distance 327 from the third imaging unit 320 to a focus surface is coincident with the distance from the third imaging unit 320 to the subject 352, it can be determined that the third imaging unit 320 images the subject 352. Therefore, the extraction unit 132 extracts a range in which the subject 351 is imaged within an imaging range in which the first imaging unit 311a and the second imaging unit 311b perform overlapping imaging as the region of interest 326. The synthesis processing unit 133 adjusts the amount of positional shift between the first image and the second image so that the subject 351 in the region of interest 326 does not appear as a double image, and generates the wide-angle image 301.

That is, if the distance 327 from the third imaging unit 320 to a focus surface is far from the imaging apparatus 300 as shown in FIG. 9A, the amount of positional shift between images when the wide-angle image 301 is generated is increased so that the subject 352 does not appear as a double image. On the other hand, if the distance 327 from the third imaging unit 320 to a focus surface is at a short distance from the imaging apparatus 300 as shown in FIG. 9B, the amount of positional shift between images when the wide-angle image 301 is generated is reduced so the subject 351 does not appear as a double image.

In this manner, the region of interest 326 is set in accordance with a distance relationship between a subject and a focus surface when the detailed image 302 is captured, whereby it is possible to reduce the possibility of a subject different from the subject which is mainly imaged by the third imaging unit 320 in the wide-angle image 301 appearing as a double image. As a result, it is possible to improve the visibility of the wide-angle image 301 in a case where the detailed image 302 is used as a supplementary image of the wide-angle image 301.

Fourth Embodiment

An imaging apparatus 400 in a fourth embodiment includes a first imaging unit 411a, a second imaging unit 411b and a third imaging unit 420. The imaging apparatus 400 has substantially the same configuration as that of any of the imaging apparatus 100, the imaging apparatus 200, and the imaging apparatus 300 of the first to third embodiments, but is different from the other imaging apparatuses in that an evaluation frame setting unit is further included. The evaluation frame setting unit sets a region (hereinafter, an evaluation frame) 427 for determining imaging parameters of the third imaging unit 420 in a detailed image 402 which is a third image acquired by the third imaging unit 420. The extraction unit 132 extracts a region of interest 426 using information of the evaluation frame 427 set by the evaluation frame setting unit. The evaluation frame 427 may be, for example, automatically set by the evaluation frame setting unit in accordance with the detection of a subject or the like, or may be set by a user designating a region on the detailed image 402.

Hereinafter, an exposure level as an imaging parameter determined in the evaluation frame 427 will be described by way of example. That is, the evaluation frame 427 functions as a photometric frame for determining an exposure level. Generally, since there is more of tendency for blown out highlights to be generated as the exposure level becomes higher, and there is more of tendency for blocked up shadows to be generated as the exposure level becomes lower, the exposure level is adjusted so that the average value of signal levels in an image is set to a proper value. As a method for adjusting an exposure level, there is a method of extracting only a specific region in an image and obtaining an average value of signal levels of the specific region. The evaluation frame 427 of the present embodiment corresponds to a specific region for obtaining an average value of signal levels. The exposure level can be adjusted by controlling the accumulation time or gain of each pixel of the imaging element 123 of the third imaging unit 420. In addition, if the imaging optical system 122 of the third imaging unit 420 has a diaphragm, it is also possible to adjust an exposure level by controlling the diaphragm.

The exposure level of the third imaging unit 420 is adjusted so that the average value of pixel signal levels in the evaluation frame 427 is coincident with a proper signal level, whereby it is possible to improve the visibility of a subject within the evaluation frame 427 regardless of the brightness of the subject. Therefore, it can be determined that a user mainly images the range of the evaluation frame 427 using the third imaging unit 420. That is, the extraction unit 132 may set the region of interest 426 in accordance with the region of the evaluation frame 427 in the detailed image 402. There are cases where the detailed image 402 which is acquired by the third imaging unit 420 is used as an enlarged image in the wide-angle image 401 and is used as a supplementary image for supplementing the wide-angle image 401. Hereinafter, the generation of the wide-angle image in each case will be described.

First, a case where the detailed image 402 is used as an enlarged image of the wide-angle image 401 will be described. In this case, when the wide-angle image 401 is generated, it is preferable to reduce the possibility of a subject which is mainly imaged by the third imaging unit 420 appearing as a double image. Therefore, the extraction unit 132 may extract the evaluation frame 427 of the detailed image 402 within an imaging range in which the first imaging unit 411a and the second imaging unit 411b perform overlapping imaging as the region of interest 426.

Figure 10B:
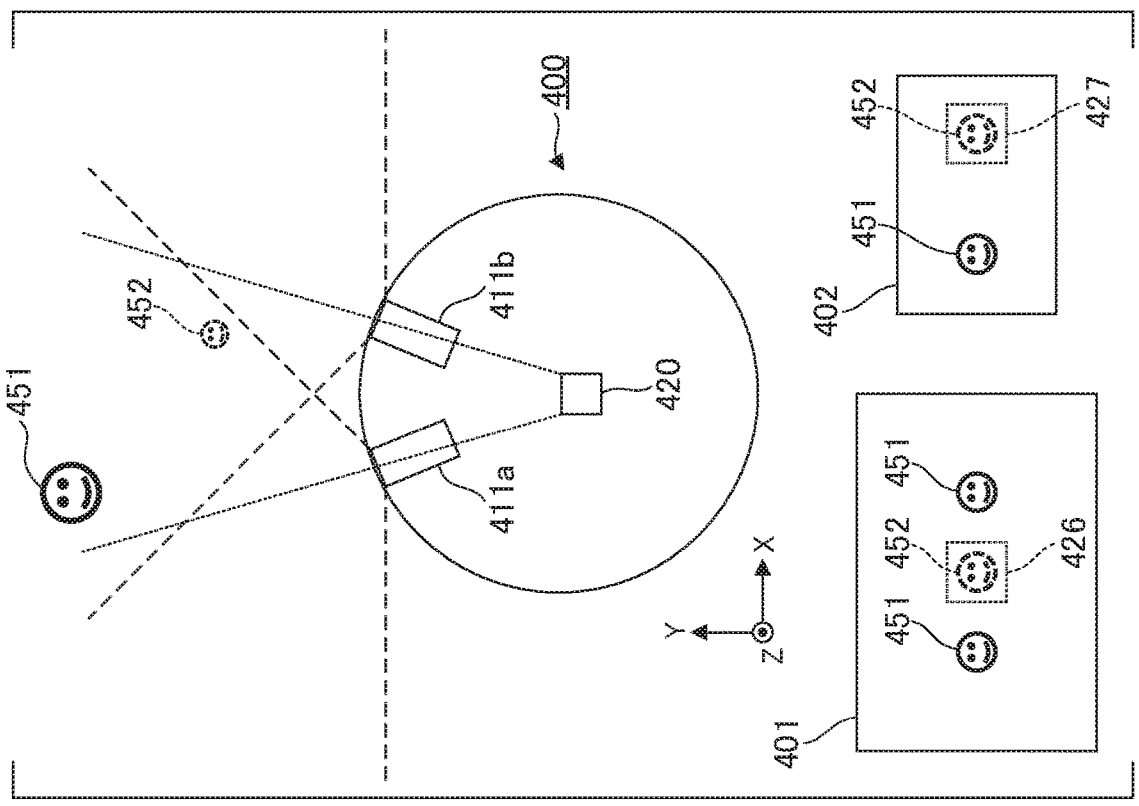
FIGS. 10A and 10B are diagrams illustrating a relationship between the imaging apparatus and a generated wide-angle image.
Figure 10A:
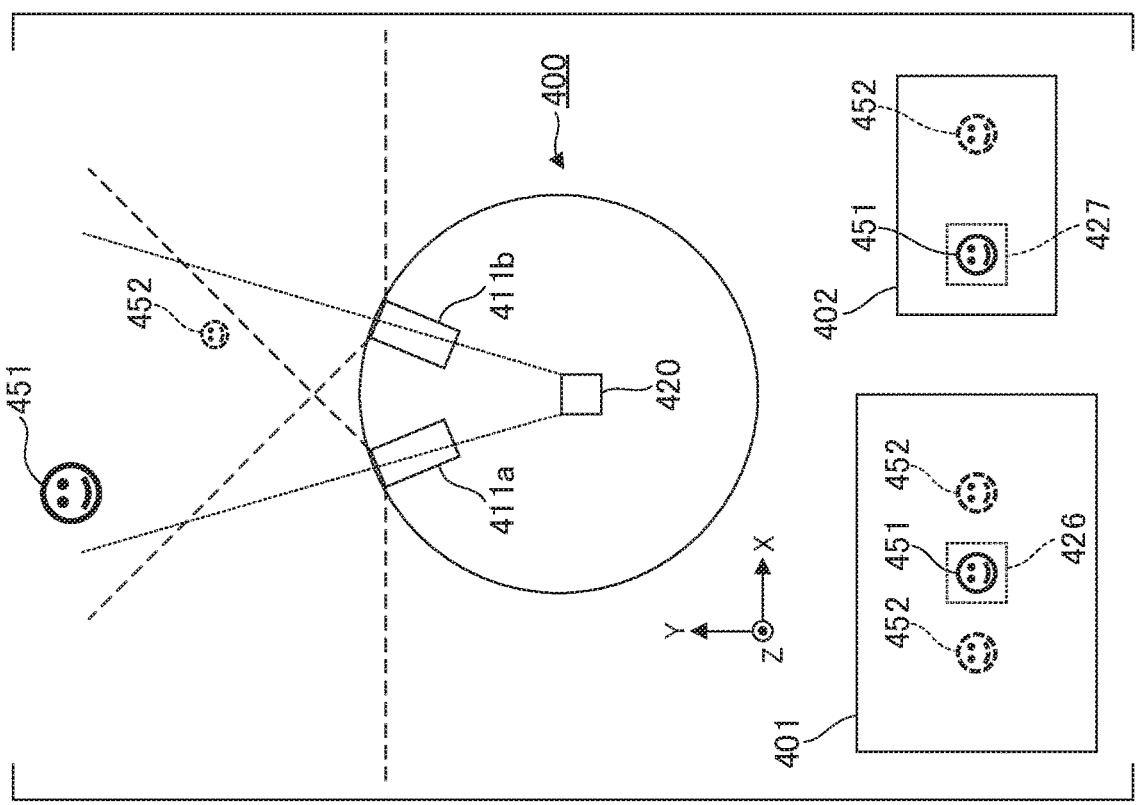

FIGS. 10A and 10B are diagrams illustrating a relationship between the imaging apparatus 400 and the wide-angle image 401 and the detailed image 402 which are generated. In FIGS. 10A and 10B, the evaluation frames 427 which are set in the third imaging unit 420 are different from each other. FIG. 10A shows a case where the evaluation frame 427 is set in a subject 451 located at a long distance from the imaging apparatus 400. On the other hand, FIG. 10B shows a case where the evaluation frame 427 is set in a subject 452 located at a short distance from the imaging apparatus 400.

In FIG. 10A, the subject 451 is included in the evaluation frame 427, and the subject 452 is not included. The extraction unit 132 extracts the evaluation frame 427 as the region of interest 426. The synthesis processing unit 133 adjusts the amount of positional shift between a first image and a second image 415b so that the subject 451 in the region of interest 426 does not appear as a double image, and generates the wide-angle image 401.

In FIG. 10B, the subject 452 is included in the evaluation frame 427, and the subject 451 is not included. The extraction unit 132 extracts the evaluation frame 427 as the region of interest 426. The synthesis processing unit 133 adjusts the amount of positional shift between the first image and the second image 415h so that the subject 452 in the region of interest 426 does not appear as a double image, and generates the wide-angle image 401.

In this manner, if the evaluation frame 427 is set as the region of interest 426, it is possible to reduce the possibility of the subject which is mainly imaged by the third imaging unit 420 appearing as a double image in the generated wide-angle image 401. As a result, it is possible to improve the visibility of the wide-angle image 401 in a case where the detailed image 402 is used as an enlarged image of the wide-angle image 401.

Next, a case where the detailed image 402 is used as a supplementary image for supplementing and monitoring the wide-angle image 401 will be described. In this case, in the wide-angle image 401, it is preferable to reduce the possibility of a subject separate from the subject which is mainly imaged in the detailed image 402 appearing as a double image. Therefore, the extraction unit 132 may extract a region different from the evaluation frame 427 in the detailed image 402 within the imaging range in which the first imaging unit 411a and the second imaging unit 411b perform overlapping imaging as the region of interest 426.

Figure 11A:
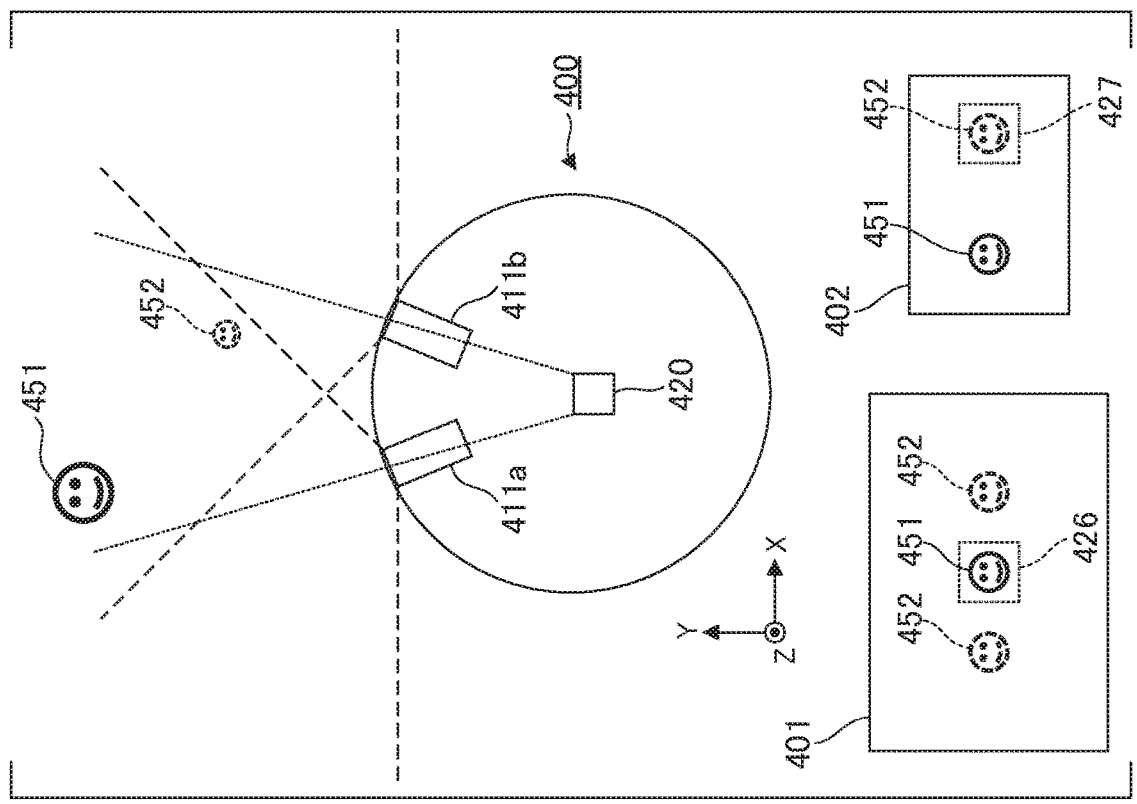
FIGS. 11A and 11B are diagrams illustrating a relationship between the imaging apparatus and a generated wide-angle image.
Figure 11B:
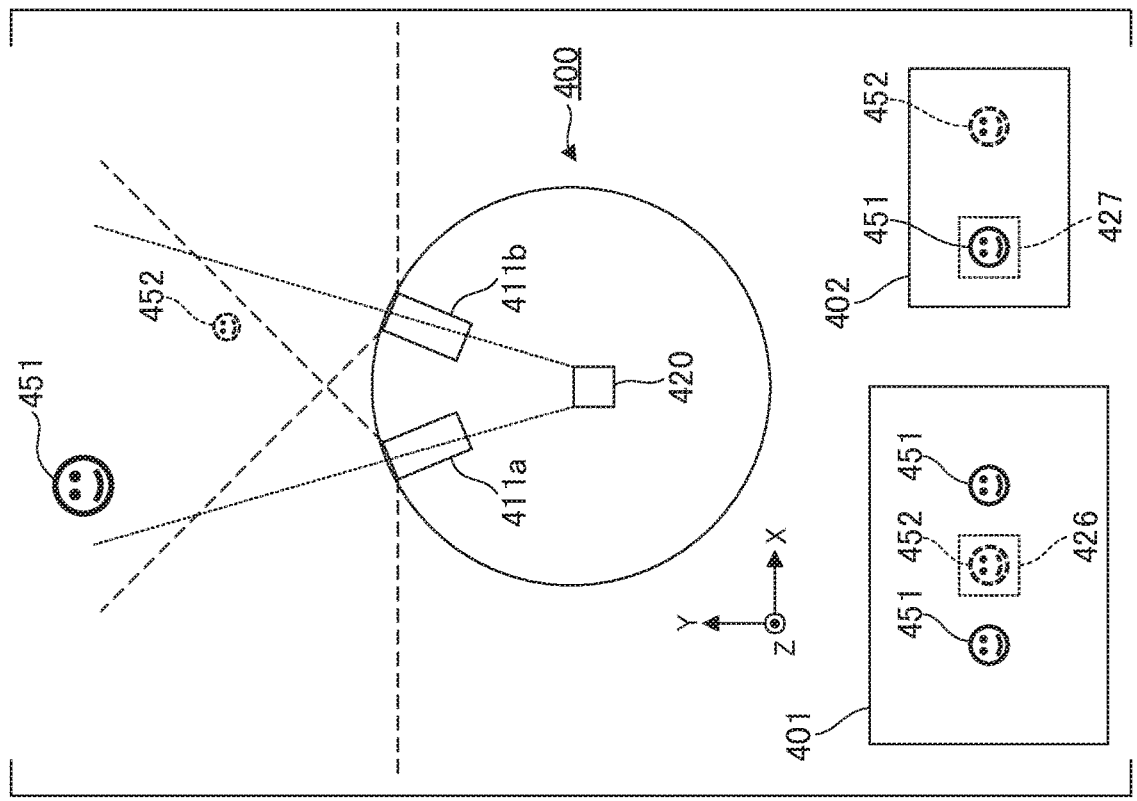

FIGS. 11A and 11B are diagrams illustrating a relationship between the imaging apparatus 400 and the wide-angle image 401 and the detailed image 402 which are generated. In FIGS. 11A and 11B, the evaluation frames 427 which are set in the third imaging unit 420 are different from each other. FIG. 11A shows a case where the evaluation frame 427 is set in the subject 451 located at a long distance from the imaging apparatus 400. On the other hand, FIG. 11B shows a case where the evaluation frame 427 is set in the subject 452 located at a short distance from the imaging apparatus 400.

In FIG. 11A, the subject 451 is included in the evaluation frame 427, and the subject 452 is not included. The extraction unit 132 extracts a region which is not included in the evaluation frame 427 as the region of interest 426. The synthesis processing unit 133 adjusts the amount of positional shift between the first image and the second image so that the subject 452 in the region of interest 426 does not appear as a double image, and generates the wide-angle image 401.

In FIG. 11B, the subject 452 is included in the evaluation frame 427, and the subject 451 is not included. The extraction unit 132 extracts a region which is not included in the evaluation frame 427 as the region of interest 426. The synthesis processing unit 133 adjusts the amount of positional shift between the first image and the second image so that the subject 451 in the region of interest 426 does not appear as a double image, and generates the wide-angle image 401.

In this manner, if the region which is not included in the evaluation frame 427 is set as the region of interest 426, it is possible to reduce the possibility of a subject separate from the subject which is mainly imaged by the third imaging unit 420 appearing as a double image in the generated wide-angle image 401. As a result, it is possible to improve the visibility of the wide-angle image 401 in a case where the detailed image 402 is used as a supplementary image of the wide-angle image 401.

As described above, if the detailed image 402 is used as an enlarged image, the evaluation frame 427 may be set to the region of interest 426, and if the detailed image 402 is used as a supplementary image, the region which is not included in the evaluation frame 427 may be set to the region of interest 426. Thereby, if the detailed image 402 is used as an enlarged image, it is possible to reduce the possibility of the subject which is mainly imaged in the detailed image 402 appearing as a double image in the generated wide-angle image 401. In addition, if the detailed image 402 is used as a supplementary image, it is possible to reduce the possibility of a subject separate from the subject which is mainly imaged in the detailed image 402 appearing as a double image in the generated wide-angle image 401. As a result, if the detailed image 402 is used as an enlarged image of the wide-angle image 401 and is used as a supplementary image, it is possible to improve the visibility of each of the wide-angle images 401.

Meanwhile, in the present embodiment, an example of the exposure level as an imaging parameter has been described, but a region for determining another imaging parameter may be set as the evaluation frame 427. For example, a region for determining the white balance of an image may be set as the evaluation frame 427. In addition, a distance measuring frame which is a region for determining the position of a focus surface may be set as the evaluation frame 427. In this manner, since there is a high possibility that the evaluation frame 427 is mainly set in a subject which is desired to be imaged by a user, the region of interest 126 may be set in accordance with the evaluation frame 427.

Fifth Embodiment

An imaging apparatus 500 in a fifth embodiment includes a first imaging unit 511a, a second imaging unit 511b and a third imaging unit 520. The imaging apparatus 500 has substantially the same configuration as that of any of the imaging apparatus 100, the imaging apparatus 200, and the imaging apparatus 300 of the first to third embodiments, but is different from the other imaging apparatuses in that a detection unit is further included. The detection unit detects a specific subject using a detailed image 502 which is a third image acquired by the third imaging unit 520. The specific subject is, for example, a subject desired to be mainly monitored using a monitoring camera (such as, for example, a person or a vehicle). The detection unit detects a specific subject, for example, by extracting a feature point from the detailed image 502. The feature point is a portion where the feature of a specific subject is expressed on an image. For example, in the case of a person, an eye, a nose, a mouth, or the like is a feature point. The extraction unit 132 extracts a region of interest 526 using information of a specific subject detected by the detection unit.

Therefore, it can be determined that a user mainly images a range 527 in which a specific subject to be monitored is imaged (hereinafter referred to as a specific subject range) using the third imaging unit 520. That is, the extraction unit 132 may set the region of interest 526 in accordance with the result of detection of a specific subject in the detailed image 502. There are cases where the detailed image 502 which is acquired by the third imaging unit 520 is used as an enlarged image in a wide-angle image 501 and is used as a supplementary image for supplementing the wide-angle image 501. Hereinafter, the generation of the wide-angle image in each case will be described.

First, a case where the detailed image 502 is desired to be used as an enlarged image of the wide-angle image 501 will be described. In this case, it is preferable to reduce the possibility of a subject which is mainly imaged by the third imaging unit 520 in the wide-angle image 501 appearing as a double image. Therefore, the extraction unit 132 extracts the specific subject range 527 in the detailed image 502 within an imaging range in which the first imaging unit 511a and the second imaging unit 511b perform overlapping imaging as the region of interest 526.

Figure 12A:
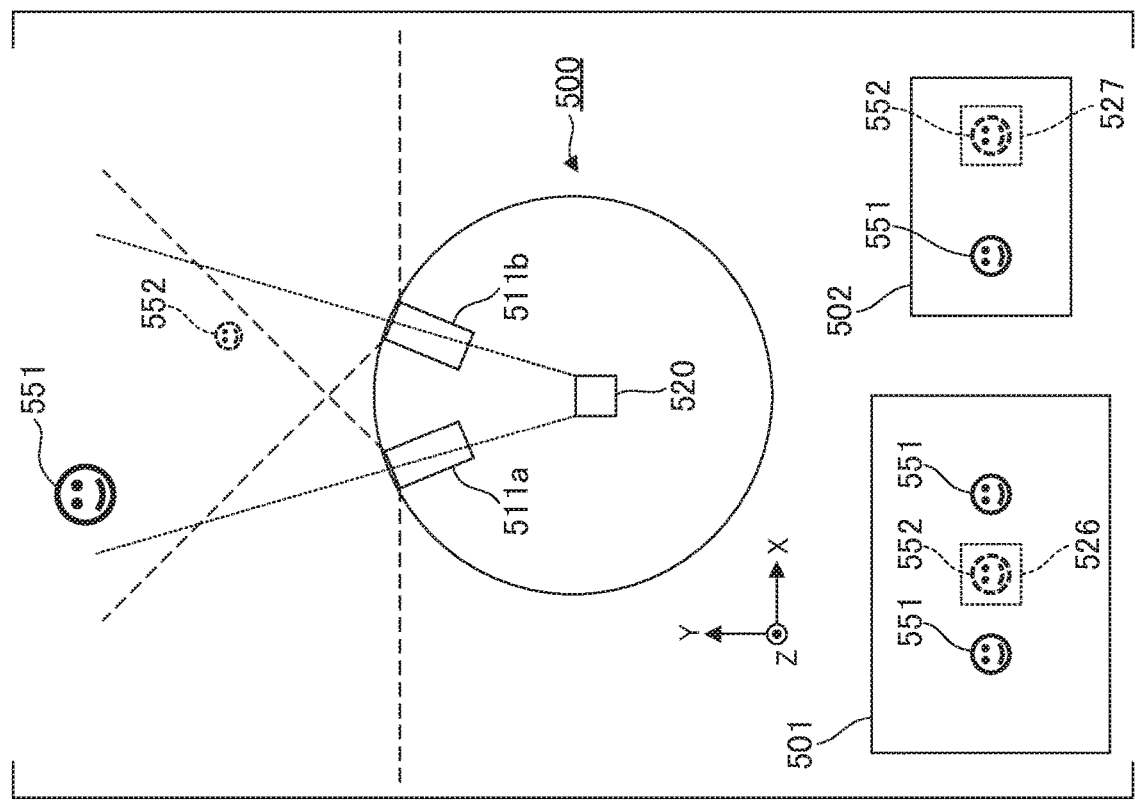
FIGS. 12A and 12B are diagrams illustrating a relationship between the imaging apparatus and a generated wide-angle image.
Figure 12B:
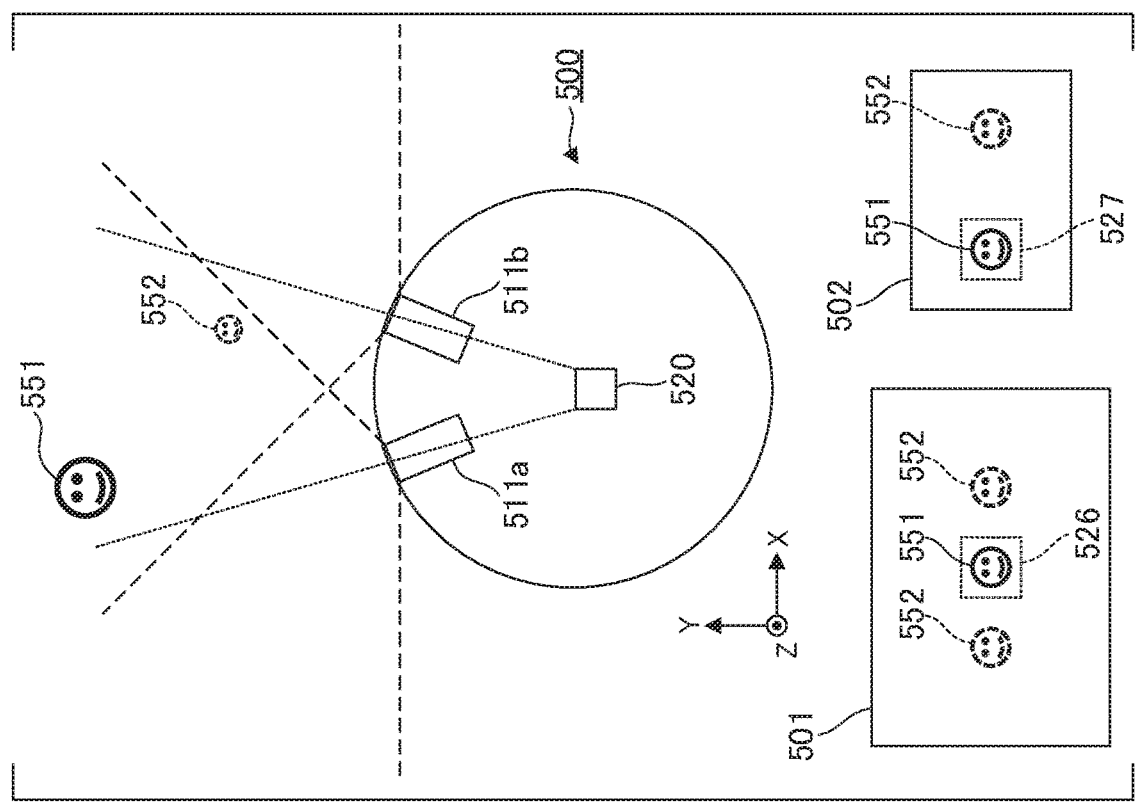

FIGS. 12A and 12B are diagrams illustrating a relationship between the imaging apparatus 500 and the wide-angle image 501 and the detailed image 502 which are generated. In FIGS. 12A and 12B, the specific subject ranges 527 corresponding to specific subjects detected by the third imaging unit 520 are different from each other. FIG. 12A shows a case where the specific subject range 527 is set in a subject 551 located at a long distance from the imaging apparatus 500. On the other hand, FIG. 12B shows a case Where the specific subject range 527 is set in the subject 452 located at a short distance from the imaging apparatus 500.

In FIG. 12A, the subject 551 is included in the specific subject range 527, and a subject 552 is not included. The extraction unit 132 extracts the specific subject range 527 as the region of interest 526. The synthesis processing unit 133 adjusts the amount of positional shift between the first image and the second image so that the subject 551 in the specific subject range 527 does not appear as a double image, and generates the wide-angle image 501.

In FIG. 12B, the subject 452 is included in the specific subject range 527, and the subject 451 is not included. The extraction unit 132 extracts the specific subject range 527 as the region of interest 526. The synthesis processing unit 133 adjusts the amount of positional shift between the first image and the second image so that the subject 552 in the region of interest 526 does not appear as a double image, and generates the wide-angle image 501.

In this manner, if the specific subject range 527 is set as the region of interest 526, it is possible to reduce the possibility of the subject which is mainly imaged by the third imaging unit 520 in the generated wide-angle image 501 appearing as a double image. As a result, it is possible to improve the visibility of the wide-angle image 501 in a case where the detailed image 502 is desired to be used as an enlarged image of the wide-angle image 501.

Next, a case where the detailed image 502 is used as an image for supplementing and monitoring the wide-angle image 501 will be described. In this case, in the wide-angle image 501, it is preferable to reduce the possibility of a subject separate from a subject which is mainly imaged in the detailed image 502 appearing as a double image. Therefore, the extraction unit 132 extracts a region different from the specific subject range 527 in the detailed image 502 within the imaging range in which the first imaging unit 511a and the second imaging unit 511b perform overlapping imaging as the region of interest 526.

Figure 13B:
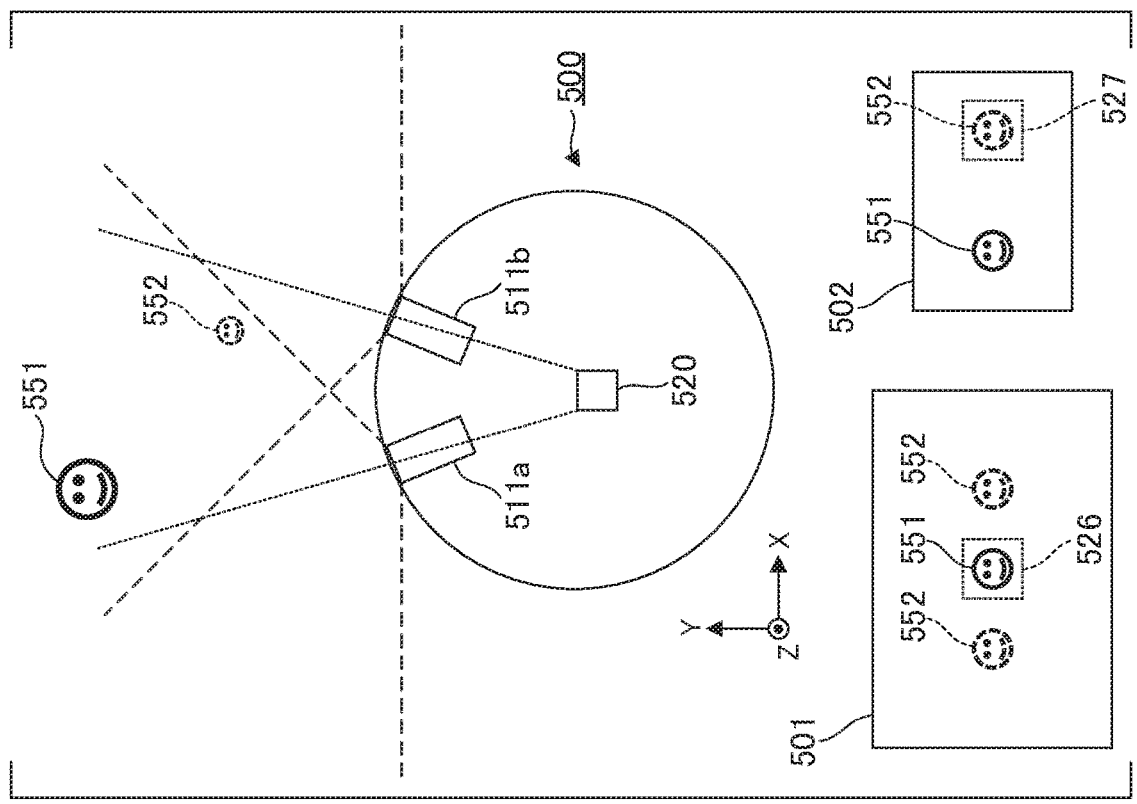
FIGS. 13A and 13B are diagrams illustrating a relationship between the imaging apparatus and a generated wide-angle image.
Figure 13A:
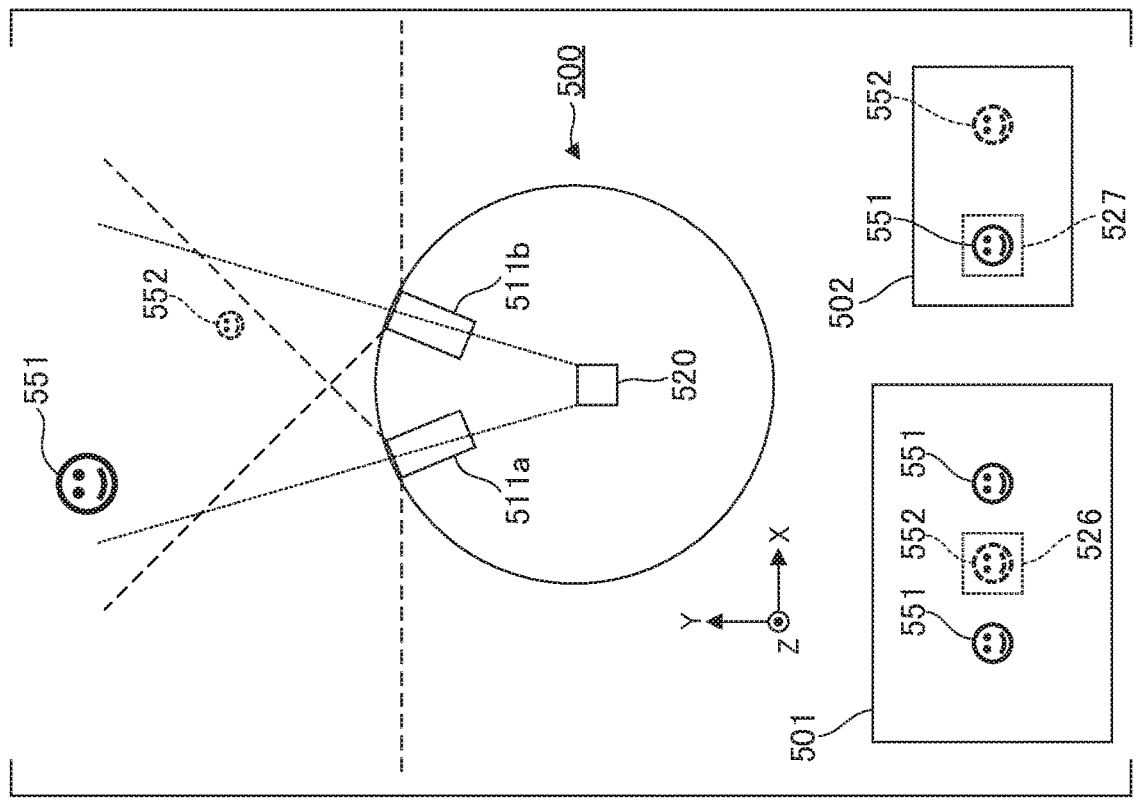

FIGS. 13A and 13B are diagrams illustrating a relationship between the imaging apparatus 500 and the wide-angle image 501 and the detailed image 502 which are generated. In FIGS. 13A and 13B, the specific subject ranges 527 corresponding to specific subjects detected by the third imaging unit 520 are different from each other. FIG. 13A shows a case where the specific subject range 527 is set in the subject 551 located at a long distance from the imaging apparatus 500. On the other hand, FIG. 13B shows a case where the specific subject range 527 is set in the subject 452 located at a short distance from the imaging apparatus 500.

In FIG. 13A, the subject 551 is included in the specific subject range 527, and the subject 552 is not included. The extraction unit 132 extracts a region which is not included in the specific subject range 527 as the region of interest 526. The synthesis processing unit 133 adjusts the amount of positional shift between the first image and the second image so that the subject 552 in the region of interest 526 does not appear as a double image, and generates the wide-angle image 501.

In FIG. 11B the subject 552 is included in the specific subject range 527, and the subject 551 is not included. The extraction unit 132 extracts a region which is not included in the specific subject range 527 as the region of interest 526. The synthesis processing unit 133 adjusts the amount of positional shift between the first image and the second image so that the subject 451 in the region of interest 526 does not appear as a double image, and generates the wide-angle image 501.

In this manner, if a region different from the specific subject range 527 is set as the region of interest 526, it is possible to reduce the possibility of a subject separate from the subject which is mainly imaged by the third imaging unit 520 appearing as a double image in the generated the wide-angle image 501. As a result, it is possible to improve the visibility of the wide-angle image 501 in a case where the detailed image 502 is used as a supplementary image of the wide-angle image 501.

In the present embodiment, as a method for detecting a specific subject, an example in which the specific subject is detected from the feature point of an image has been illustrated, but there is no limitation thereto. For example, a subject which is clearly imaged may be detected within the detailed image 502. The definition of a subject can be obtained by the contrast, brightness, color difference, spatial frequency component, or the like of each region of an image. For example, a difference between a maximum signal level and a minimum signal level in a pixel signal may be used as a definition. In addition, since information of a moving object is more important than information of an object remaining at rest in a monitoring camera, a moving subject (hereinafter called a moving object) may be detected as a specific subject from a difference between the detailed images 502 acquired by a plurality of frames.

The first to fifth embodiments illustrated above may be used in appropriate combination. For example, the third imaging unit can have all of the imaging direction, imaging angle of view, and focusing position thereof changed, and a region of interest may be extracted in combination of the three pieces of information. In addition, a region of interest may be extracted using both the state of the third imaging unit and information of the third image. For example, if a plurality of subjects are present within the imaging angle of view of the third imaging unit, a specific subject is extracted from these subjects, first, using the third image. Among these subjects, a region of a subject which is close to the imaging direction of the third imaging unit or close to a focusing position may be set as a region of interest. In this manner, the accuracy of extraction of a region of interest in a wide-angle image is improved by combining a plurality of pieces of information.

Other Embodiments

Embodiment(s) of the present invention can also be realized by a computer of a system or apparatus that reads out and executes computer executable instructions e.g., one or more programs) recorded on a storage medium (which may also be referred to more fully as 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the present invention is not limited to the disclosed exemplary embodiments. The scope of the following claims is to be accorded the broadest interpretation so as to encompass all such modifications and equivalent structures and functions.

This application claims the benefit of Japanese Patent Application No. 2018-188401, filed Oct. 3, 2018, which is hereby incorporated by reference wherein in its entirety.

What is claimed is:

1. An image processing apparatus comprising:
a controller having a processor which executes instructions stored in a memory or having circuitry, the controller being configured to function as:
a synthesis processing unit configured to synthesize a first image acquired by a first imaging unit and a second image acquired by a second imaging unit of which an imaging range overlaps a part of an imaging range of the first imaging unit and generates a wide-angle image; and
an extraction unit configured to extract a region of interest that includes a subject of interest within an overlapping imaging range in which the first imaging unit and the second imaging unit perform overlapping imaging, on the basis of at least one of a third image, acquired by a third imaging unit, which includes at least a part of the overlapping imaging range and a state of the third imaging unit when the third image is captured,
wherein the synthesis processing unit adjusts an amount of positional shift between the first image and the second image in the region of interest so that the subject of interest in the region of interest does not appear as a double image, and generates the wide-angle image.

2. The image processing apparatus according to claim 1, wherein the extraction unit extracts the region of interest on the basis of the imaging range of the third image.

3. The image processing apparatus according to claim 2, wherein the imaging range is an imaging direction or an imaging angle of view of the third imaging unit.

4. The image processing apparatus according to claim 1, wherein the extraction unit extracts the region of interest on the basis of a distance from the region of interest to a focus surface when the third image is captured.

5. The image processing apparatus according to claim 1, wherein the extraction unit extracts the region of interest on the basis of a region in which an evaluation frame for determining imaging parameters of the third imaging unit is set.

6. The image processing apparatus according to claim 5, wherein the imaging parameters are any of an exposure level, a white balance and a position of a focus surface.

7. The image processing apparatus according to claim 6, wherein the extraction unit extracts the region of interest on the basis of a region corresponding to a specific subject detected by a detection unit.

8. The image processing apparatus according to claim 1, wherein the extraction unit changes the region of interest to be extracted in accordance with cases where the third image is used as an enlarged image of the wide-angle image and is used as a supplementary image.

9. An imaging apparatus comprising:
an image processing apparatus;
a first imaging unit;
a second imaging unit of which an imaging range overlaps a part of an imaging range of the first imaging unit; and
a third imaging unit imaging a range overlapping at least one imaging range of the first imaging unit or the second imaging unit,
the image processing apparatus including
a controller having a processor which executes instructions stored in a memory or having circuitry, the controller being configured to function as
a synthesis processing unit configured to synthesize a first image acquired by the first imaging unit and a second image acquired by the second imaging unit and generates a wide-angle image, and
an extraction unit configured to extract a region of interest within an imaging range in which the first imaging unit and the second imaging unit perform overlapping imaging on the basis of at least one of a third image acquired by the third imaging unit and a state of the third imaging unit when the third image is captured,
wherein the synthesis processing unit adjusts an amount of positional shift between the first image and the second image in the region of interest so that the subject of interest in the region of interest does not appear as a double image, and generates the wide-angle image.

10. A method for controlling an image processing apparatus, comprising:
synthesis processing for synthesizing a first image acquired by a first imaging unit and a second image acquired by a second imaging unit of which an imaging range overlaps a part of an imaging range of the first imaging unit and generating a wide-angle image; and extracting a region of interest that includes a subject of interest within an overlapping imaging range in which the first imaging unit and the second imaging unit perform overlapping imaging on the basis of at least one of a third image, acquired by a third imaging unit, which includes at least a part of overlapping the imaging range and a state of the third imaging unit when the third image is captured, wherein the synthesis processing adjusts an amount of positional shift between the first image and the second image in the region of interest so that the subject of interest in the region of interest does not appear as a double image, and generates the wide-angle image.

11. A non-transitory recording medium storing a control program of an image processing apparatus causing a computer to perform each step of a control method of the image processing apparatus, the method comprising:

synthesis processing for synthesizing a first image acquired by a first imaging unit and a second image acquired by a second imaging unit of which an imaging range overlaps a part of an imaging range of the first imaging unit and generating a wide-angle image; and extracting a region of interest that includes a subject of interest within an overlapping imaging range in which the first imaging unit and the second imaging unit perform overlapping imaging on the basis of at least one of a third image, acquired by a third imaging unit, which includes at least a part of the overlapping imaging range and a state of the third imaging unit when the third image is captured, wherein the synthesis processing adjusts an amount of positional shift between the first image and the second image in the region of interest so that the subject of interest in the region of interest does not appear as a double image, and generates the wide-angle image.

* * * * *